United States Patent
Lin et al.

(10) Patent No.: US 9,974,093 B2
(45) Date of Patent: May 15, 2018

(54) SLOTTED SUB-BAND DUPLEX FRAME STRUCTURE DESIGN IN A WIDEBAND TIME-DIVISION DUPLEX SYSTEM

(71) Applicant: QUALCOMM Incorporated, San Diego, CA (US)

(72) Inventors: Jamie Menjay Lin, San Diego, CA (US); Joseph Binamira Soriaga, San Diego, CA (US); Tingfang Ji, San Diego, CA (US); Jing Jiang, San Diego, CA (US); Naga Bhushan, San Diego, CA (US); Rotem Cooper, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 193 days.

(21) Appl. No.: 15/085,602

(22) Filed: Mar. 30, 2016

(65) Prior Publication Data
US 2016/0323909 A1    Nov. 3, 2016

Related U.S. Application Data

(60) Provisional application No. 62/154,582, filed on Apr. 29, 2015.

(51) Int. Cl.
*H04W 72/12* (2009.01)
*H04W 72/14* (2009.01)
(Continued)

(52) U.S. Cl.
CPC ....... *H04W 72/1263* (2013.01); *H04J 3/1694* (2013.01); *H04L 1/16* (2013.01);
(Continued)

(58) Field of Classification Search
None
See application file for complete search history.

(56) References Cited

U.S. PATENT DOCUMENTS

| | | | | |
|---|---|---|---|---|
| 2012/0243485 | A1* | 9/2012 | Merlin | H04W 28/20 370/329 |
| 2014/0105157 | A1* | 4/2014 | Yang | H04L 5/0007 370/329 |
| 2014/0204807 | A1* | 7/2014 | Li | H04B 1/50 370/277 |

FOREIGN PATENT DOCUMENTS

EP    2858396 A2    4/2015

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre ; 650 , Route Des Lucioles ; F-06921 Sophia-Antipolis Cedex; France, vol. RAN WG1, No. V12.4.0, Jan. 3, 2015 (Jan. 3, 2015), pp. 1-124, XP050927386, [retrieved on Jan. 3, 2015] chapter 1 "scope" chapter 4 "Frame structure".

(Continued)

*Primary Examiner* — Adnan Baig
(74) *Attorney, Agent, or Firm* — Loza & Loza, LLP

(57) ABSTRACT

A method, an apparatus, and a computer program product for wireless communication are provided. The method includes scheduling at a scheduling entity, a first frame for transmission over a wireless network that supports time division duplexing (TDD), where the first frame includes a first duplex symbol that includes a first bandwidth to be used for uplink transmission to the scheduling entity and a second bandwidth to be used for downlink transmission from the scheduling entity, and using the second bandwidth to trans- (Continued)

mit scheduling information while the first frame is being transmitted. The scheduling information may be related to a second frame that is scheduled to be transmitted immediately after the first frame. The scheduling information includes an uplink grant or a downlink grant.

30 Claims, 21 Drawing Sheets

(51) Int. Cl.
    *H04J 3/16*         (2006.01)
    *H04L 1/16*         (2006.01)
    *H04L 12/801*      (2013.01)
    *H04L 12/873*      (2013.01)
    *H04L 12/851*      (2013.01)

(52) U.S. Cl.
    CPC ............ *H04L 47/14* (2013.01); *H04L 47/522* (2013.01); *H04W 72/14* (2013.01); *H04L 47/24* (2013.01)

(56) References Cited

OTHER PUBLICATIONS

International Search Report and Written Opinion—PCT/US2016/025377—ISA/EPO—dated Jun. 9, 2016.

\* cited by examiner

SLOTTED SUB-BAND DUPLEX FRAME STRUCTURE DESIGN IN A WIDEBAND TIME-DIVISION DUPLEX SYSTEM

CROSS-REFERENCE TO RELATED APPLICATIONS

This application claims the benefit of U.S. Provisional Application Ser. No. 62/154,582 filed in the U.S. Patent Office on Apr. 29, 2015, the entire content of which being incorporated herein by reference and for all applicable purposes.

TECHNICAL FIELD

The present disclosure relates generally to communication systems, and more particularly to frame structures for use in a wireless communications system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. Examples of telecommunication standards include Long Term Evolution (LTE) and LTE-Advanced (LTE-A), which include a set of enhancements to the Universal Mobile Telecommunications System (UMTS) mobile standard promulgated by the Third Generation Partnership Project (3GPP). LTE and LTE-A are designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in multiple access technologies technology. Preferably, these improvements should be applicable to existing and developing multi-access technologies and the telecommunication standards that employ such technologies.

SUMMARY

Certain aspects disclosed herein relate to frame structures that can be employed to support responsive and efficient duplex communications in an access network that employs time-division duplex technologies. The frame structures are configurable and enable tradeoffs to be made between spectral utilization and signaling latency for both control and data signals according to characteristics of an application or deployment.

In various aspects, a method at a scheduling entity includes scheduling a first frame for transmission over a wireless network that supports time division duplexing, where the first frame has a first duplex symbol that includes a first bandwidth to be used for uplink transmission to the scheduling entity and a second bandwidth to be used for downlink transmission from the scheduling entity. The method includes using the second bandwidth to transmit scheduling information while the first frame is being transmitted. The scheduling information may be related to a second frame that is scheduled to be transmitted immediately after the first frame. The scheduling information may include an uplink grant or a downlink grant.

In some aspects, the first frame is a downlink-centric frame and the method includes transmitting a payload of the first frame in a plurality of downlink symbols, receiving an acknowledgement or negative acknowledgement responsive to the payload, and transmitting the scheduling information while receiving the acknowledgement or negative acknowledgement. In one example, the acknowledgement or negative acknowledgement may be received using the first bandwidth. The first frame may have a second duplex symbol that includes an unused bandwidth corresponding in frequency to the first bandwidth. The second duplex symbol may immediately precede the first duplex symbol in transmission.

In one aspect, the first frame is an uplink-centric frame, and the method may include receiving a payload of the first frame in a plurality of symbols, transmitting the scheduling information using the second bandwidth, and transmitting an acknowledgement or negative acknowledgement after the payload is completely received. The first duplex symbol may be included in the plurality of symbols. In some instances, the plurality of symbols includes one or more uplink symbols.

In some aspects, the scheduling information includes a high-priority grant.

In certain aspects, the method includes configuring the first frame based on previous scheduling information provided in a third frame. The third frame may immediately precede the first frame in transmission.

In one aspect, the first duplex symbol is an orthogonal frequency division multiplexing symbol.

In certain aspects, the wireless network communicates using a single carrier, and the first bandwidth may include a first sub-band of the single carrier and the second bandwidth may include a second sub-band of the single carrier. The wireless network may employ carrier aggregation to provide an aggregated bandwidth, and the first bandwidth may include a first carrier component of the aggregated bandwidth and the second bandwidth may include a second carrier component of the aggregated bandwidth. The first bandwidth may be aligned with a boundary of the first carrier component. The second bandwidth may be aligned with a boundary of the second carrier component.

In one aspect, the method includes allocating at least one antenna in an antenna array for broadcast transmissions by the scheduling entity, and allocating a plurality of remaining antennas for receiving transmissions at the scheduling entity.

In some aspects, the method includes transmitting one or more broadcast messages or control signals from the scheduling entity. The one or more broadcast messages or control signals may be multiplexed in the first duplex symbol with one or more control messages or low data transmissions received the scheduling entity. A waveform processor may be used to modify a characteristic of one or more signals carried in the first duplex symbol. A first unidirectional symbol may be transmitted without using the waveform processor to modify the characteristic of signals in the first unidirectional symbol, and a second unidirectional symbol may be received where the second unidirectional symbol has been transmitted without using the waveform processor to modify the characteristic of signals in the second unidirectional symbol. The waveform processor may include a weighted overlap-add filter bank processor that improves separation between the uplink transmission and the downlink transmission.

In various aspects, an apparatus may include a scheduling entity. The scheduling entity may have means for scheduling a first frame for transmission over a wireless network that supports time division duplexing, where the first frame includes a first duplex symbol that includes a first bandwidth to be used for uplink transmission to the scheduling entity and a second bandwidth to be used for downlink transmission from the scheduling entity. The apparatus may include means for transmitting scheduling information related to a second frame that is scheduled to be transmitted immediately after the first frame. The means for transmitting scheduling information may be configured to use the second bandwidth to transmit the scheduling information while the first frame is being transmitted. The scheduling information may include an uplink grant or a downlink grant.

In various aspects, an apparatus may be a scheduling entity that includes a processing system configured to schedule a first frame for transmission over a wireless network that supports time division duplexing, where the first frame includes a first duplex symbol that provides a first bandwidth to be used for uplink transmission to the scheduling entity and a second bandwidth to be used for downlink transmission from the scheduling entity, and use the second bandwidth to transmit scheduling information while the first frame is being transmitted. The scheduling information may be related to a second frame that is scheduled to be transmitted immediately after the first frame. The scheduling information may include an uplink grant or a downlink grant.

In one aspect, the scheduling entity may have, or be coupled to, an antenna array having a first plurality of antennas allocated to transmit signals from the scheduling entity and a second plurality of antennas allocated to receive directed to the scheduling entity.

In various aspects, a processor-readable medium may include a computer-readable medium having code stored thereon. The computer-readable medium may be a transitory storage medium or non-transitory storage medium. The code may be executable by a processor. When executed the code may cause the processor to schedule at a scheduling entity, a first frame for transmission over a wireless network that supports time division duplexing, where the first frame includes a first duplex symbol that provides a first bandwidth to be used for uplink transmission to the scheduling entity and a second bandwidth to be used for downlink transmission from the scheduling entity, and use the second bandwidth to transmit scheduling information while the first frame is being transmitted. The scheduling information may be related to a second frame that is scheduled to be transmitted immediately after the first frame. The scheduling information may include an uplink grant or a downlink grant.

In various aspects, a method may include receiving first scheduling information from a scheduling entity in a first duplex symbol of a first frame received from a wireless network that supports time division duplexing, where the first duplex symbol includes a first bandwidth that carries an uplink transmission to the scheduling entity and a second bandwidth that carries a downlink transmission from the scheduling entity, and communicating with the scheduling entity using a second frame configured in accordance with the first scheduling information. A second duplex symbol in the second frame may include a third bandwidth that carries second scheduling information corresponding to a third frame. The first scheduling information may include an uplink grant or a downlink grant.

In certain aspects, the first frame is a downlink-centric frame and the method includes receiving a payload of the first frame in a plurality of downlink symbols, transmitting an acknowledgement or negative acknowledgement responsive to the payload, and receiving the scheduling information while transmitting the acknowledgement or negative acknowledgement. The acknowledgement or negative acknowledgement may be transmitted using the first bandwidth. The first frame may have a third duplex symbol that includes an unused bandwidth corresponding in frequency to the first bandwidth. The third duplex symbol may immediately precede the first duplex symbol in transmission.

In some aspects, the first frame is an uplink-centric frame, and the method includes transmitting a payload of the first frame in a plurality of symbols, receiving the scheduling information using the second bandwidth, and receiving an acknowledgement or negative acknowledgement after the payload is completely transmitted. The first duplex symbol may be included in the plurality of symbols. The plurality of symbols may include one or more uplink symbols.

In one aspect, the scheduling information may include a high-priority grant. The first frame may be configured in accordance with previous scheduling information provided in a fourth frame. The fourth frame may immediately precede the first frame in transmission.

In one aspect, the first duplex symbol is an orthogonal frequency division multiplexing symbol.

In one aspect, the wireless network communicates using a single carrier, and the first bandwidth includes a first sub-band of the single carrier and the second bandwidth includes a second sub-band of the single carrier.

In some aspects, the wireless network employs carrier aggregation to provide an aggregated bandwidth, and the first bandwidth includes a first carrier component of the aggregated bandwidth and the second bandwidth includes a second carrier component of the aggregated bandwidth. The first bandwidth may be aligned with a boundary of the first carrier component, and the second bandwidth may be aligned with a boundary of the second carrier component.

In various aspects, an apparatus configured to communicate with the scheduling entity in the wireless network may include means for receiving first scheduling information from a scheduling entity in a first duplex symbol of a first frame received from a wireless network that supports time division duplexing, where the first duplex symbol includes a first bandwidth that carries an uplink transmission to the scheduling entity and a second bandwidth that carries a downlink transmission from the scheduling entity, and means for communicating with the scheduling entity using a second frame configured in accordance with the first scheduling information. A second duplex symbol in the second frame may include a third bandwidth that carries second scheduling information corresponding to a third frame. The first scheduling information may include an uplink grant or a downlink grant.

In various aspects, a subordinate device configured to communicate with the scheduling entity in the wireless communication network may include a processing system configured to receive first scheduling information from a scheduling entity in a first duplex symbol of a first frame received from a wireless network that supports time division duplexing, where the first duplex symbol includes a first bandwidth that carries an uplink transmission to the scheduling entity and a second bandwidth that carries a downlink transmission from the scheduling entity. The processing system may be configured to communicate with the scheduling entity using a second frame configured in accordance with the first scheduling information. A second duplex symbol in the second frame may include a third bandwidth that carries second scheduling information corresponding to a third frame. The first scheduling information may include an uplink grant or a downlink grant.

In certain aspects, the first frame is a downlink-centric frame, and the processing system may be configured to receive a payload of the first frame in a plurality of downlink symbols, transmit an acknowledgement or negative acknowledgement responsive to the payload, and receive the scheduling information while transmitting the acknowledgement or negative acknowledgement. The acknowledgement or negative acknowledgement may be transmitted using the first bandwidth. The first frame may have a third duplex symbol that includes an unused bandwidth corresponding in frequency to the first bandwidth. The third duplex symbol may immediately precede in the first duplex symbol in transmission.

In various aspects, a computer-readable medium may include code for receiving first scheduling information from a scheduling entity in a first duplex symbol of a first frame received from a wireless network that supports time division duplexing, the first duplex symbol including a first bandwidth that carries an uplink transmission to the scheduling entity and a second bandwidth that carries a downlink transmission from the scheduling entity, and for communicating with the scheduling entity using a second frame configured in accordance with the first scheduling information. A second duplex symbol in the second frame may include a third bandwidth that carries second scheduling information corresponding to a third frame. The first scheduling information may include an uplink grant or a downlink grant.

DETAILED DESCRIPTION

Figure 1:
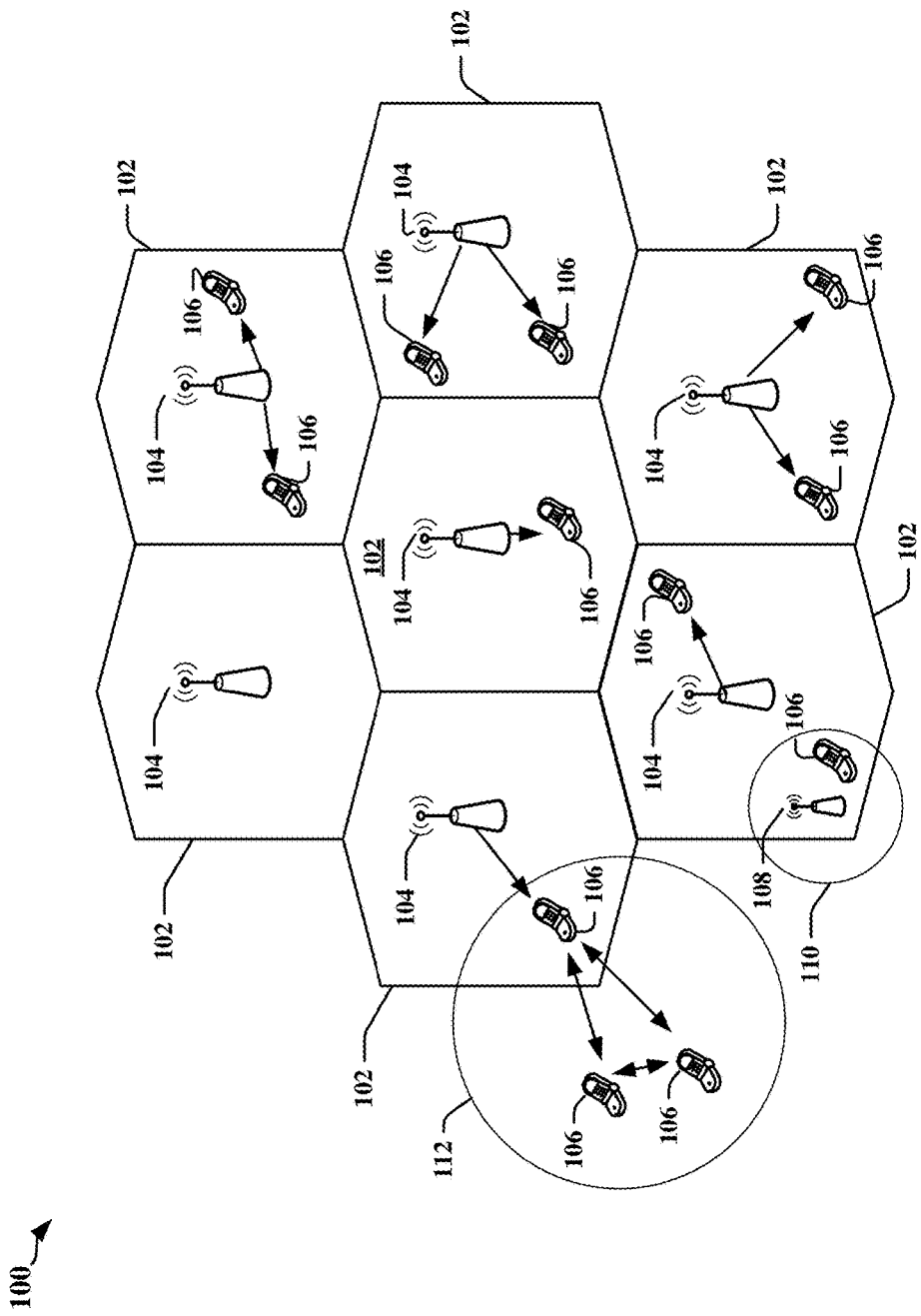
FIG. 1 illustrates an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

The various concepts presented throughout this disclosure may be implemented across a broad variety of telecommunication systems, network architectures, and communication standards. For example, the 3GPP defines several wireless communication standards for networks including the evolved packet system (EPS), frequently referred to as LTE networks. LTE networks can provide end-to-end latency between a transmitting device and a receiving device on the order of 50 ms, with over-the-air latency for a particular packet being in the range of 10 ms. Currently known LTE functionality provides for a round trip time (RTT) for certain feedback signaling (i.e., hybrid automatic repeat request (HARQ) signaling) of at least about 8 ms, using a transmission time interval (TTI) of 1ms. Here, a TTI may correspond to a minimum duration for a unit of information that can independently be decoded. For time division duplex (TDD) LTE configurations, the uplink/downlink latency has a relatively fixed configuration, which takes around 10 ms to change. In general, LTE provides for a one-size-fits-all approach with all services and packets relying on these same latency ranges.

Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Here, these different sets of services may benefit from having multiple latency targets that are drastically different from one another. However, the one-size-fits-all aspects of the LTE network described above can make the multiplexing of traffic with different latency targets very difficult.

FIG. 1 is a diagram illustrating a generalized example of an access network 100. In this example, the access network 100 is divided into a number of cellular regions (cells) 102. One or more lower power class base stations 108 may have cellular regions 110, 112 that overlap with one or more of the cells 102. The lower power class base station 108 may be a femto cell (e.g., home base station, pico cell, micro cell, remote radio head, or in some instances, a user equipment (UE) 106 as illustrated generally as the mesh network 112). The base stations 104 are each assigned to a respective cell 102 and are configured to provide an access point to a core network for all of the UEs 106 in the cells 102. There is no centralized controller in this example of an access network 100, but a centralized controller may be used in alternative configurations. The base stations 104 are responsible for all radio related functions including radio bearer control, admission control, mobility control, scheduling, security, and connectivity to the serving gateway 116.

The modulation and multiple access scheme employed by the access network 100 may vary depending on the particular telecommunications standard being deployed. In some radio access networks, such as those defined according to LTE, orthogonal frequency division multiplexing (OFDM) is used on the DL and SC-FDMA is used on the UL to support both frequency division duplexing (FDD) and TDD. As those skilled in the art will readily appreciate from the detailed description to follow, the various concepts presented herein are well suited for various applications including telecommunication standards employing other modulation and multiple access techniques. By way of example, these concepts may be employed in 5G, LTE, LTE-A, Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Institute of Electrical and Electronic Engineers (IEEE) 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The base stations 104 may have multiple antennas supporting MIMO technology. The use of MIMO technology enables the base stations 104 to exploit the spatial domain to support spatial multiplexing, beamforming, and transmit diversity. Spatial multiplexing may be used to transmit different streams of data simultaneously on the same frequency. The data steams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 106 with different spatial signatures, which enables each of the UE(s) 106 to recover the one or more data streams destined for that UE 106. On the UL, each UE 106 transmits a spatially precoded data stream, which enables the base station 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Certain aspects of an access network described herein may relate to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 2:
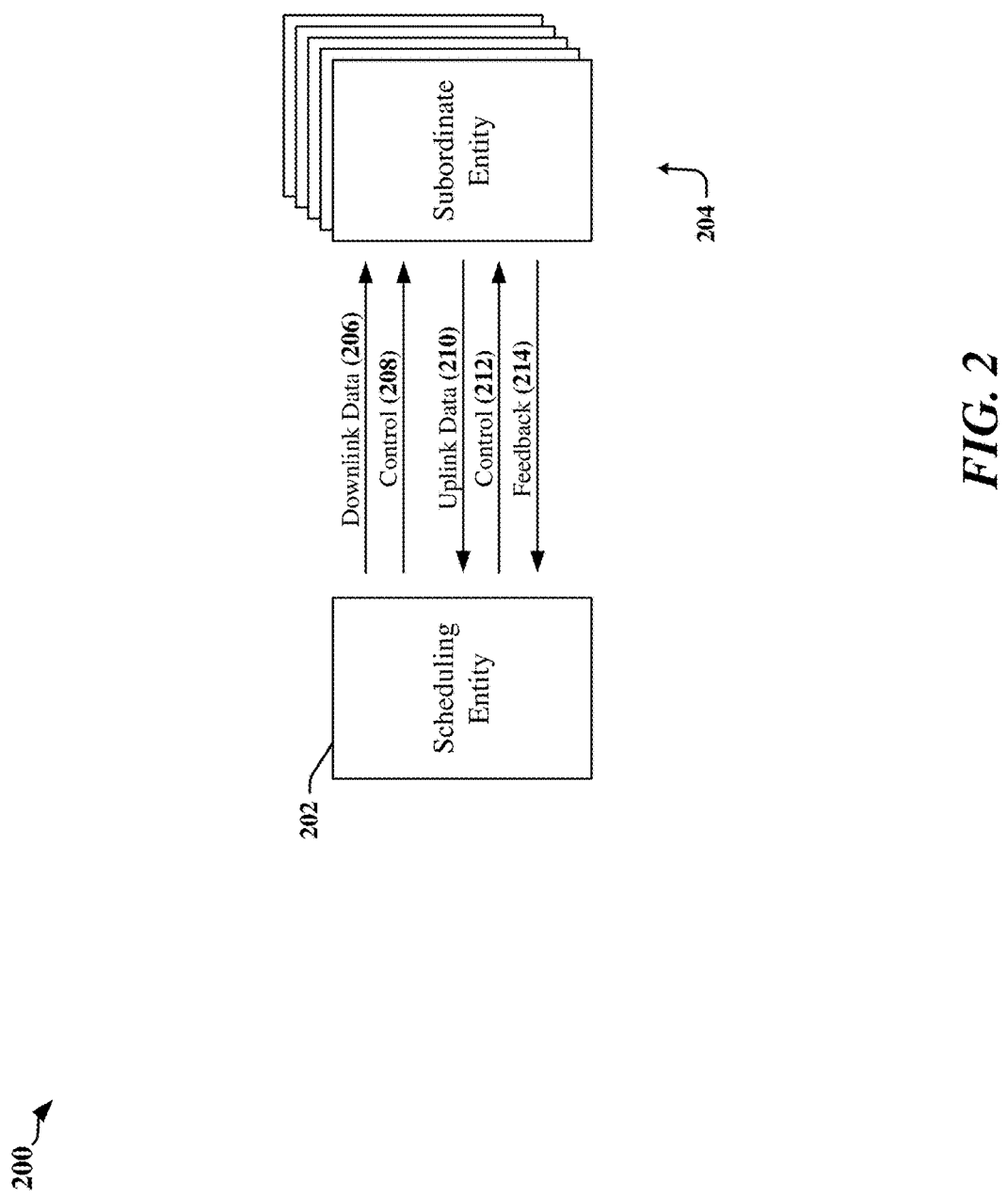
FIG. 2 illustrates a scheduling entity communicating with subordinate entities according to some embodiments.

Referring now to FIG. 2, a block diagram illustrates a scheduling entity 202 and a plurality of subordinate devices, or subordinate entities 204. Of course, the channels illustrated in FIG. 2 are not necessarily all of the channels that may be utilized between a scheduling entity 202 and the subordinate entities 204, and those of ordinary skill in the art will recognize that other channels may be utilized in addition to those illustrated, including other control and feedback channels. As illustrated in FIG. 2, the scheduling entity 202 may broadcast downlink data 206 to one or more subordinate entities 204. In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more subordinate entities to the scheduling entity 202. (Another way to describe the scheme may be to use the term broadcast channel multiplexing.) In accordance with aspects of the present disclosure, the term uplink may refer to a point-to-point transmission originating at a subordinate entity 204. Broadly, each of the subordinate entities 204 is a node or device that receives scheduling control information, including but not limited to scheduling grants, synchronization or timing information, or other control information from another entity in the wireless communication network such as the scheduling entity 202.

The scheduling entity 202 may broadcast a control channel 208 and/or 212 to one or more subordinate entities 204. Uplink data 210 and/or downlink data 206 may be transmitted using a transmission time interval (TTI). Here, a TTI may correspond to an encapsulated set or packet of information capable of being independently decoded, i.e., the shortest decodable transmission of information. In various examples, TTIs may correspond to frames, to data blocks, time slots, or other suitable groupings of bits for transmission.

The subordinate entities 204 may transmit a feedback channel 214 to the scheduling entity 202. The feedback channel 214 may in some examples include a request for the scheduling entity to schedule uplink transmissions. Here, in response to the request transmitted on the feedback channel 214, the scheduling entity 202 may transmit in the control channel 212 information that may schedule the TTI with uplink packets. In one example, the feedback channel 214 may include information about interference experienced at the subordinate entity 204, which the scheduling entity 202 may utilize dynamically to modify downlink transmissions in a way that may make further downlink transmissions more robust to the interference.

Figure 3:
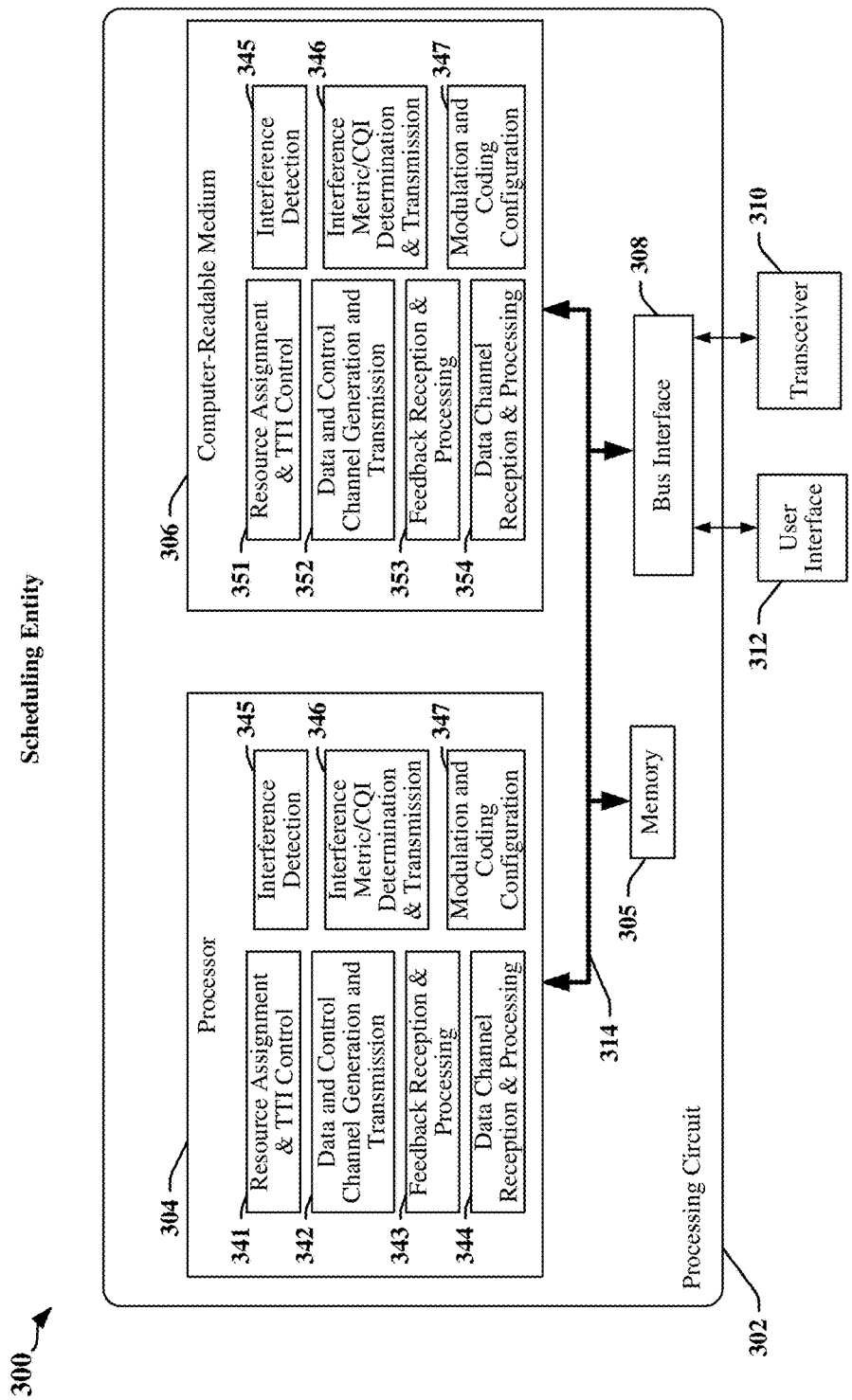
FIG. 3 illustrates an example of a hardware implementation for a scheduling entity employing a processing system according to some embodiments.

FIG. 3 is a conceptual diagram illustrating an example of a hardware implementation for a scheduling entity 300, which may correspond to the scheduling entity 202 of FIG. 2. The scheduling entity 300 may have a processing circuit 302, which may include or be embodied in application specific integrated circuit (ASIC), system-on-chip (SoC) or some combination of integrated circuit (IC) devices provided on one or more substrates, circuit boards, chip carriers, or the like. In accordance with various aspects of the disclosure, an element, or any portion of an element, or any combination of elements may be implemented using one or more processors 304 of the processing circuit 302.

In various aspects of the disclosure, the scheduling entity 300 may be any suitable radio transceiver apparatus, and in some examples, may be embodied in a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. A base station may provide wireless access points to a core network for any number of user equipment (UE).

In other examples, the scheduling entity 300 may be embodied in a wireless UE. Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology.

Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 304, as utilized in a scheduling entity 300, may execute software in order to implement one or more processes described herein.

In this example, the processing circuit 302 may be implemented with a bus architecture, represented generally by the bus 314. The bus 314 may include any number of interconnecting buses and bridges depending on the specific application of the processing circuit 302 and the overall design constraints. The bus 314 links together various circuits including one or more processors (represented generally by the processor 304), a memory 305, and computer-readable media (represented generally by the computer-readable medium 306). The bus 314 may also link various other circuits such as timing sources, peripherals, voltage regulators, and power management circuits, which are well known in the art, and therefore, will not be described any further. A bus interface 308 provides an interface between the bus 314 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

In some aspects of the disclosure, the processor 304 may include resource assignment and TTI control circuitry 341, configured to generate, schedule, and modify a resource assignment or grant of time-frequency resources. The resource assignment and TTI control circuitry 341 may operate in coordination with resource assignment and TTI control software 351. The processor 304 may further include data and control channel generation and transmission circuitry 342, configured to generate and transmit uplink and downlink data and control channels, as well as uplink feedback channels and downlink control channels. The data and control channel generation and transmission circuitry 342 may operate in coordination with data and control channel generation and transmission software 352. The processor 304 may further include feedback reception and processing circuitry 343, configured to receive scheduling requests on an uplink feedback channel, the scheduling requests being configured to request a grant of time-frequency resources for uplink user data transmissions. In some examples, the feedback reception and processing circuitry 343 may further be configured to receive and process interference metrics including but not limited to a channel quality indicator (CQI). The feedback reception and processing circuitry 343 may operate in coordination with feedback reception and processing software 353. The processor 304 may further include data channel reception and processing circuitry 344, configured to receive and process user data on uplink data channels from one or more subordinate entities. The data channel reception and processing circuitry 344 may operate in coordination with data channel and reception and processing software 354.

The processor 304 may further include interference detection circuitry 345, configured for detecting interference that interferes with uplink and/or downlink communication with one or more subordinate entities. The interference detection circuitry 345 may operate in coordination with interference detection software 355. The processor 304 may further include interference metric/channel quality indicator determination and transmission circuitry 346, configured to generate one or more of a CQI, persistency information relating to the interference, a frequency of the interference, a power of the interference, or spatial information corresponding to the interference. The interference metric/CQI determination and transmission circuitry 346 may operate in coordination with interference metric/CQI determination and transmission software 356. The processor 304 may further include modulation and coding configuration circuitry 347, configured for determining a modulation and coding scheme (MCS) to utilize for downlink transmissions and/or a MCS for a subordinate entity to utilize for uplink transmissions. The modulation and coding configuration circuitry 347 may operate in coordination with modulation and coding configuration software 357.

The processor 304 is responsible for managing the bus 314 and general processing, including the execution of software stored on the computer-readable medium 306. The software, when executed by the processor 304, causes the processing circuit 302 to perform the various functions described below for any particular apparatus. The computer-readable medium 306 may also be used for storing data that is manipulated by the processor 304 when executing software.

Figure 4:
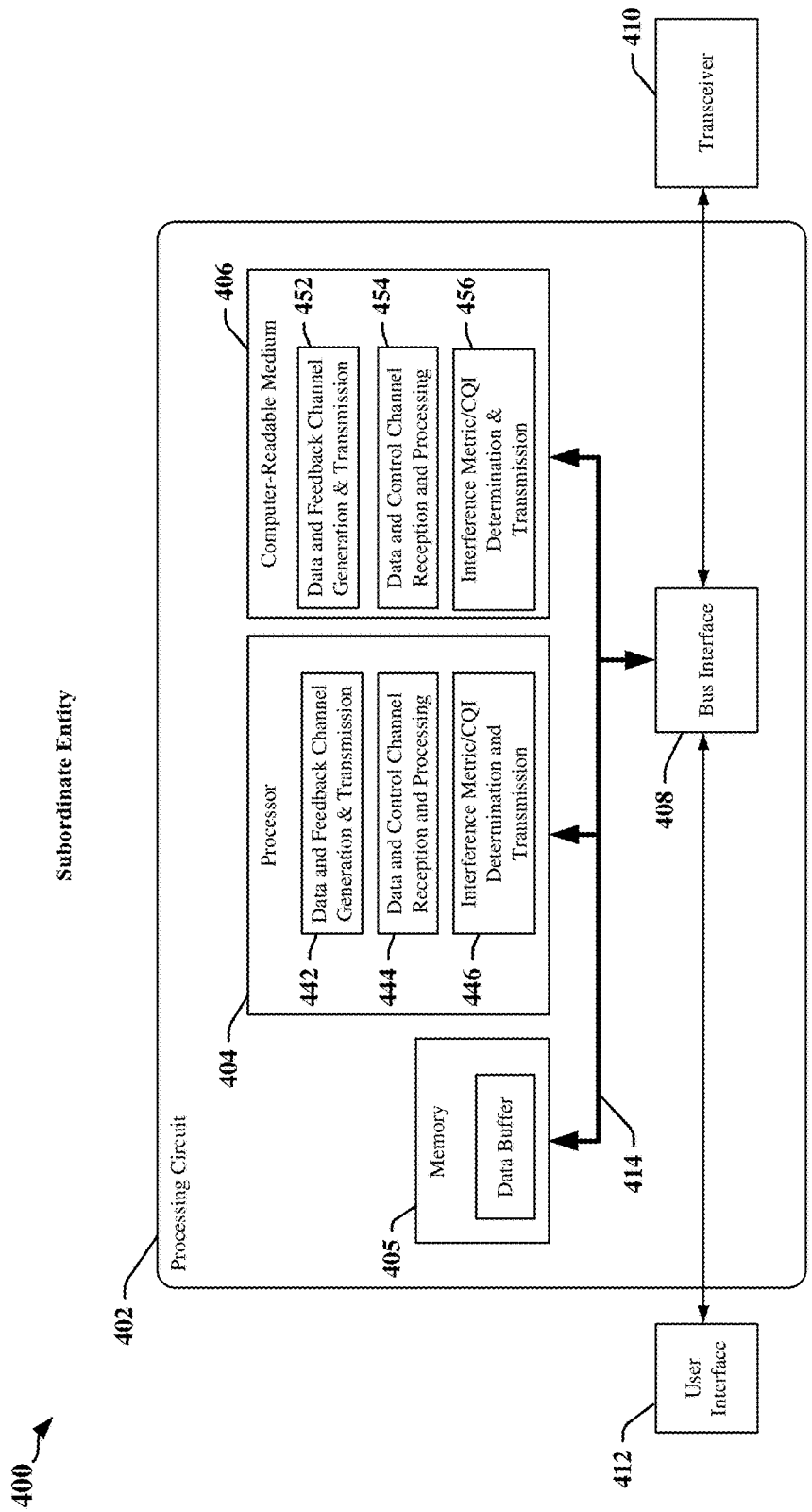
FIG. 4 illustrates an example of a hardware implementation for a subordinate entity employing a processing system according to some embodiments.

FIG. 4 is a conceptual diagram illustrating an example of a subordinate entity 400, which may correspond to one of the subordinate entities 204. The subordinate entity 400 may have a processing circuit 402, which may include or be embodied in ASIC, SoC or some combination of IC devices provided on one or more substrates, circuit boards, chip carriers, or the like. In accordance with various aspects of the disclosure, an element, or any portion of an element, or any combination of elements may be implemented with a processing circuit 402 that includes one or more processors 404.

The processing circuit 402 may be substantially the same as the processing circuit 302 illustrated in FIG. 3, and may include a bus interface 408, a bus 414, memory 405, a processor 404, and a computer-readable medium 406. Furthermore, the subordinate entity 400 may provide a user interface 412 and include a transceiver 410 substantially similar to those described above in FIG. 3.

In some aspects of the disclosure, the processor 404 may include data and feedback channel generation and transmission circuitry 442, configured to generate and transmit uplink data on a data channel, and to generate and transmit uplink feedback on a feedback channel. The data and feedback channel generation and transmission circuitry 442 may operate in coordination with data and feedback channel generation and transmission software 452. The processor 404 may further include data and control channel reception and processing circuitry 444, configured for receiving and processing downlink data on a data channel, and to receive and process control information on one or more downlink control channels. In some examples, received downlink data and/or control information may be temporarily stored in a data buffer within memory 405. The processor 404 may further include interference metric/CQI determination and transmission circuitry 446, configured for detecting interference that interferes with uplink and/or downlink communication with one or more scheduling entities, and generating one or more of a CQI, persistency information relating to the interference, a frequency of the interference, a power of the interference, or spatial information corresponding to the interference, for transmission to the scheduling entity. The interference metric/CQI determination and transmission circuitry 446 may operate in coordination with the interference metric/CQI determination and transmission software 456.

Carrier Aggregation

Certain radio access technologies (RATs) use spectrum that is allocated in a carrier aggregation (CA) scheme to obtain a total bandwidth that is the combined bandwidth of a plurality of component carriers. The combined bandwidth may be used for transmission in each direction. In some instances, less traffic is transmitted on the uplink than the downlink, and the uplink spectrum allocation may be smaller than the downlink allocation. For example, if 20 MHz is assigned to the uplink, the downlink may be assigned 100 Mhz. These asymmetric FDD assignments can conserve spectrum and may be a good fit for the typically asymmetric bandwidth utilization by broadband subscribers.

Figure 5:
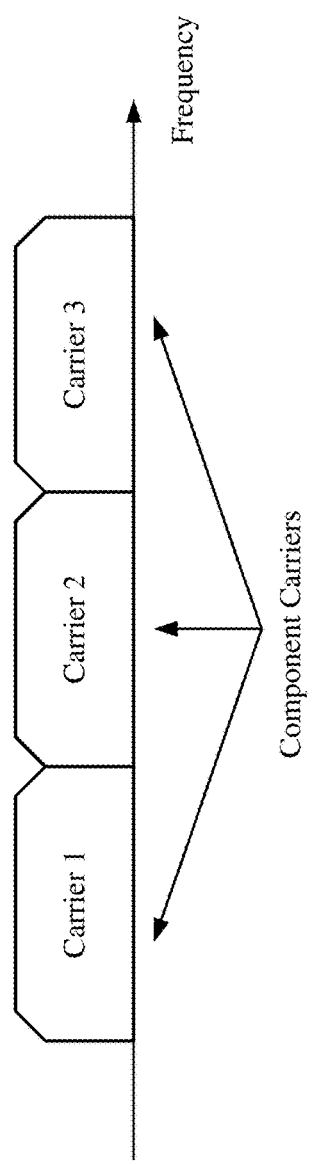
FIG. 5 illustrates a continuous carrier aggregation type.
Figure 6:
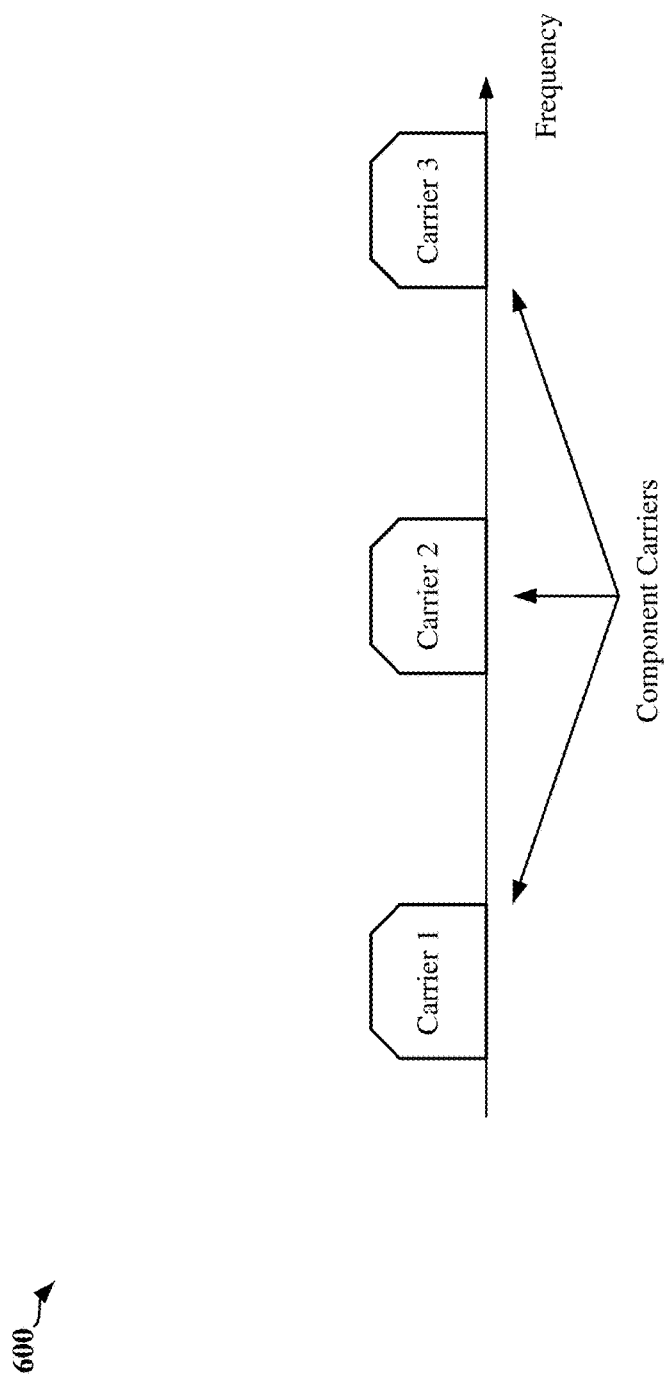
FIG. 6 illustrates a non-continuous carrier aggregation type.

With reference to FIGS. 5 and 6, different CA schemes may be employed according to application needs or requirements. Possible CA schemes include continuous CA and non-continuous CA. FIG. 5 illustrates an example of continuous CA that employs a plurality of available component carriers that are adjacent to each other. As illustrated in FIG. 6, non-continuous CA may be used when multiple available component carriers are separated within a frequency band. In one example, non-continuous and continuous CA may aggregate multiple component carriers to serve a single device.

A device may employ multiple radio frequency (RF) receiving units and one or more processors performing multiple Fast Fourier Transforms (FFTs) for non-continuous CA, since multiple carriers are separated along the frequency band. Because non-continuous CA supports data transmissions over multiple separated carriers across a large frequency range, propagation path loss, Doppler shift and other radio channel characteristics may vary considerably at different frequency bands.

In one example, a scheduling entity may have a fixed transmitting power on each component carrier, and the effective coverage or supportable modulation and coding of each component carrier may vary. Accordingly, coding, modulation and transmission power may be adaptively adjusted for different component carriers to support broadband data transmission under the non-continuous CA approach.

Figure 7:
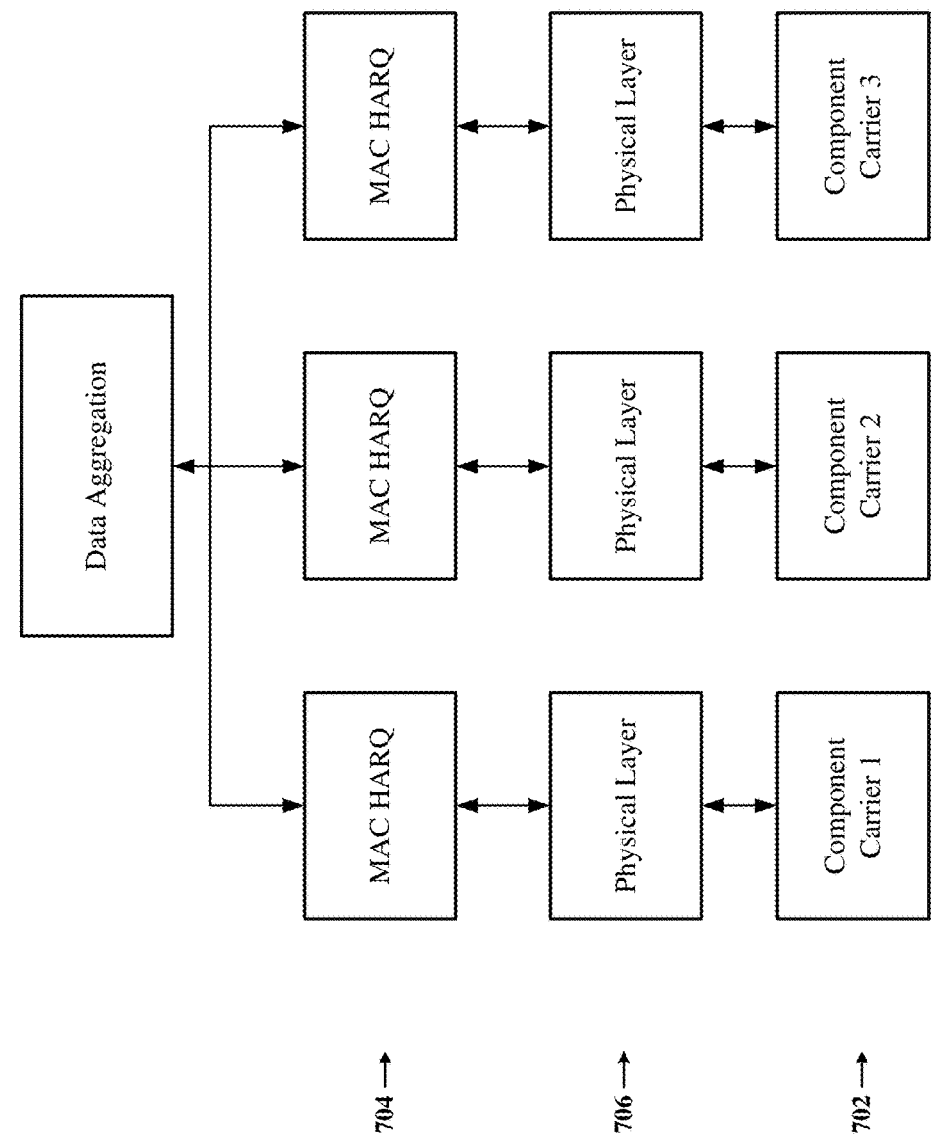
FIG. 7 illustrates medium access layer data aggregation.

FIG. 7 illustrates certain aspects related to aggregating transmission blocks (TBs) from different component carriers at the medium access (MAC) layer in the example of an International Mobile Telecommunication (IMT) Advanced system. With MAC layer data aggregation, each component carrier 702 may have its own independent HARQ entity 704, or the equivalent thereof, in the MAC layer. Each component carrier 702 may maintain or employ its own transmission configuration parameters in the physical layer 706 including transmitting power parameters, modulation and coding scheme parameters, and/or multiple antenna configuration parameters, for example. Similarly, in the physical layer 706, one HARQ entity may be provided for each component carrier 702.

Various approaches for deploying control channel signaling may be adopted for multiple component carriers. In one example, each component carrier may be assigned or allocated its own coded control channel. In a second example, the control channels of different component carriers may be jointly coded and the control channels may be deployed in a dedicated component carrier. The control information for the multiple component carriers can be integrated as the signaling content in this dedicated control channel. In a third example, multiple control channels for different component carriers may be jointly coded and then transmitted over the entire frequency band. This approach offers low signaling overhead and high decoding performance in control channels, at the expense of high power consumption.

In a conventional time division duplex (TDD) scheme, information is carried on a carrier in one direction at a time. That is, from the perspective of a transceiver utilizing that carrier, the transmitter either transmits or receives at any given instant of time, but does not receive and transmit simultaneously. The carrier is generally divided into time slots (or subframes), where packets are transmitted during Tx slots and received during Rx slots. Communication utilizing a TDD carrier has certain drawbacks. For example, full-duplex communication is only achieved over a relatively long timescale, and at very short timescales, within the range of the duration of subframes, communication in only one direction at a time is available on the carrier. That is, while a device is transmitting a symbol, its receiver is disabled and generally unable to receive a symbol transmitted by another device. Similarly, while a device is receiving a symbol, its transmitter is disabled and it is generally unable to transmit a symbol to another device.

Self-Contained Frames

Figure 8:
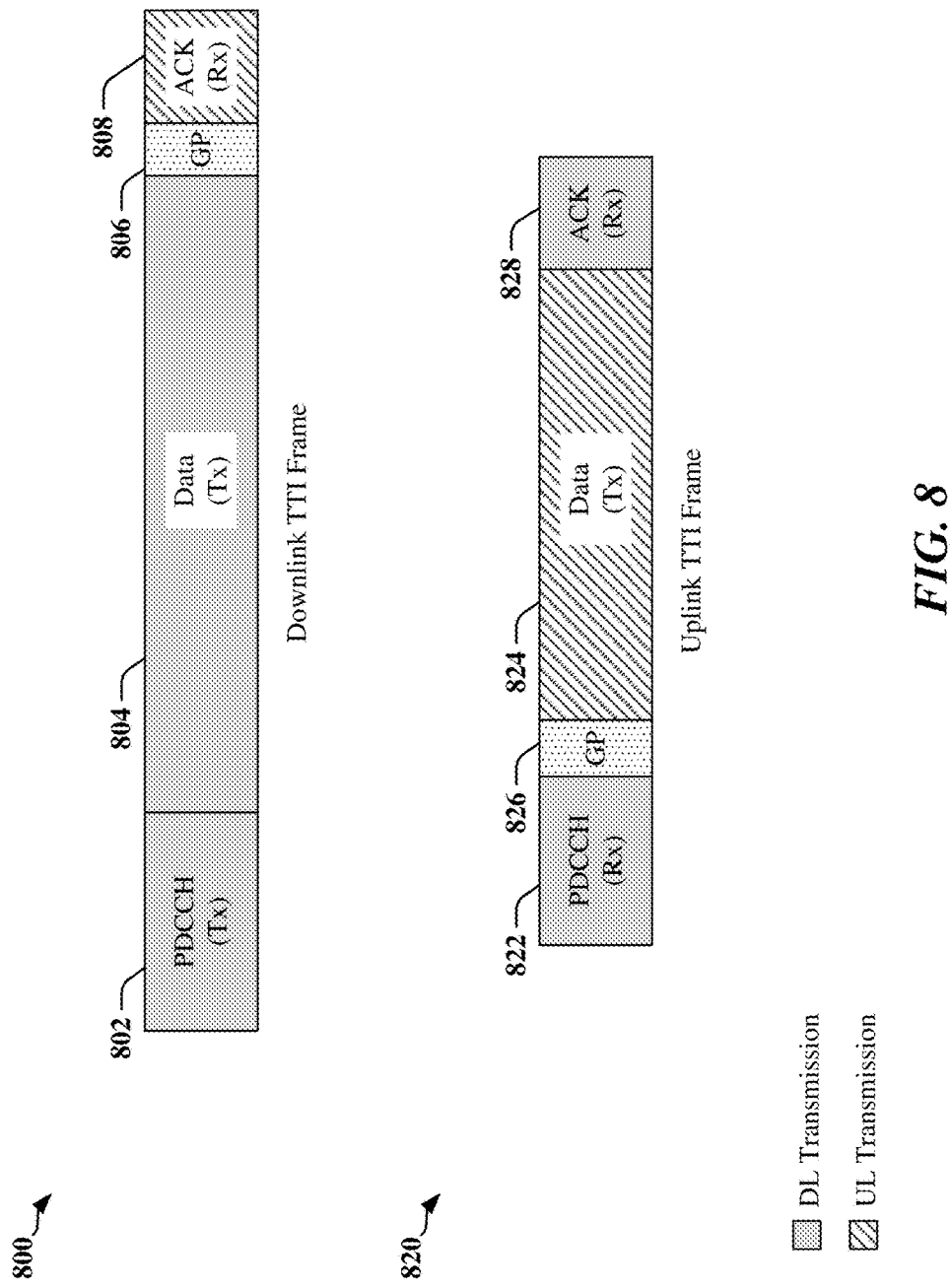
FIG. 8 illustrates the structure of self-contained frames in a wireless access network that supports time division duplexing.

FIG. 8 illustrates examples of the structure of self-contained frames 800, 820 that may be used in some access networks to reduce the full-duplex timescale and to ameliorate other issues with access networks that support TDD. A transmitter-scheduled frame, referred to herein as a downlink TTI frame or DL frame 800, may be used to carry control, data and/or scheduling information to a subordinate entity, which may be a UE for example. A receiver-scheduled frame, referred to herein as an uplink TTI frame or UL frame 820, may be used to carry control, data and/or scheduling information to a scheduling entity. These frames may be better understood from the point of view of different nodes utilizing a carrier. In the context of a multiple access network, channel resources are generally scheduled, and each entity is synchronous. That is, each node utilizing the network coordinates its usage of the resources such that transmissions are only made during the allocated portion of the frame, and the timing of each allocated portion is synchronized among the different nodes.

One node acts as a scheduling entity. The scheduling entity may be a base station or access point, or a UE in a device-to-device (D2D) and/or mesh network (e.g., see FIGS. 2-4). The scheduling entity manages the resources on the carrier and assigns resources to other users of the channel, including subordinate or scheduled entities, such as one or more UEs in a cellular network. Each frame is divided into Tx and Rx portions.

In the DL frame 800, the scheduling entity first has an opportunity to transmit control information, which may be provided in a Physical Downlink Control Channel field (PDCCH 802), and then an opportunity to transmit data or other information as DL Data 804. Following a guard period (GP 806), which may correspond to a gap between transmissions, the scheduling entity has an opportunity to use the carrier to receive feedback from other entities in a feedback field 808. This frame structure is downlink-centric, as more resources are allocated for transmissions from the scheduling entity in the downlink direction.

In the UL frame 820, the scheduled entity first has an opportunity to receive control information to other entities, in PDCCH 822 for example. Then, following a guard period (GP 826), the scheduled entity has an opportunity to transmit data or other information (UL Data 824) to other entities using the carrier, and then to receive feedback from other entities in a feedback field 828 at the end of the frame 820. This frame structure is uplink-centric, as more resources are allocated for transmissions from subordinate or scheduled entities in the uplink direction.

In one example, the downlink frame 800 includes a PDCCH 802, a data payload field carried as DL Data 804, the GP 806, and an acknowledgement (ACK) in a feedback field 808. The GP 806 may be scheduled to accommodate variability in UL and DL timing. For example, transmission path latencies may cause a subordinate entity to transmit early on the UL to match DL timing. However, such early transmission may interfere with symbols received from the scheduling entity. Accordingly, the GP 806 may provide a time of one or two symbols duration to prevent interference. In some instances, enhanced receiver technology may be employed to perform interference cancellation and may render the GP 806 unnecessary. The uplink frame 820 includes PDCCH 822, a data payload field carried as UL Data 824, the GP 826 preceding the transmission of the UL Data 824, and the feedback field 828.

Certain limitations associated with the structure of the self-contained frames 800, 820 may include spectral utilization inefficiency for certain symbols. In TDD-based access networks that employ self-contained frames 800, 820 to obtain improved duplex operation, each OFDM symbol is limited to a single direction. For example, the feedback field 808, 828 typically carries a small number of bits or, in some instances, a single bit to communicate an acknowledgement. The complete bandwidth is nevertheless allocated during the transmission time associated with the feedback field 808, 828, and the reservation of full bandwidth for fields such as the feedback fields 808, 828 represents a loss of useful bandwidth. A symbol limited to a single direction may be referred to as a unidirectional symbol. One type of unidirectional symbol may be dedicated for uplink transmissions and may be referred to as an uplink symbol. A second type of unidirectional symbol may be dedicated for downlink transmissions and may be referred to as a downlink symbol.

The use of self-contained frames 800, 820 may be unable to provide sufficiently low latency to support certain services and requirements associated with advanced access networks, and low-latency applications may be compromised in a TDD-based access network which offers limited opportunities to schedule high priority transmissions. For example, high-priority downlink communications may be delayed when an uplink frame 820 is transmitted because the scheduling entity has no opportunity to schedule the high-priority DL transmission after the PDCCH field 822 has been transmitted. In the UL-centric frame 820, the dominant portion is the payload field (UL Data 824), which prevents the system from scheduling and signaling higher-priority updates.

Slotted Sub-Band Duplex Frames

Certain aspects disclosed herein provide for adaptation of self-contained frames to provide a modified frame structure that can be employed to support more responsive and/or efficient duplex communications in an access network that employs TDD technologies.

Figure 9:
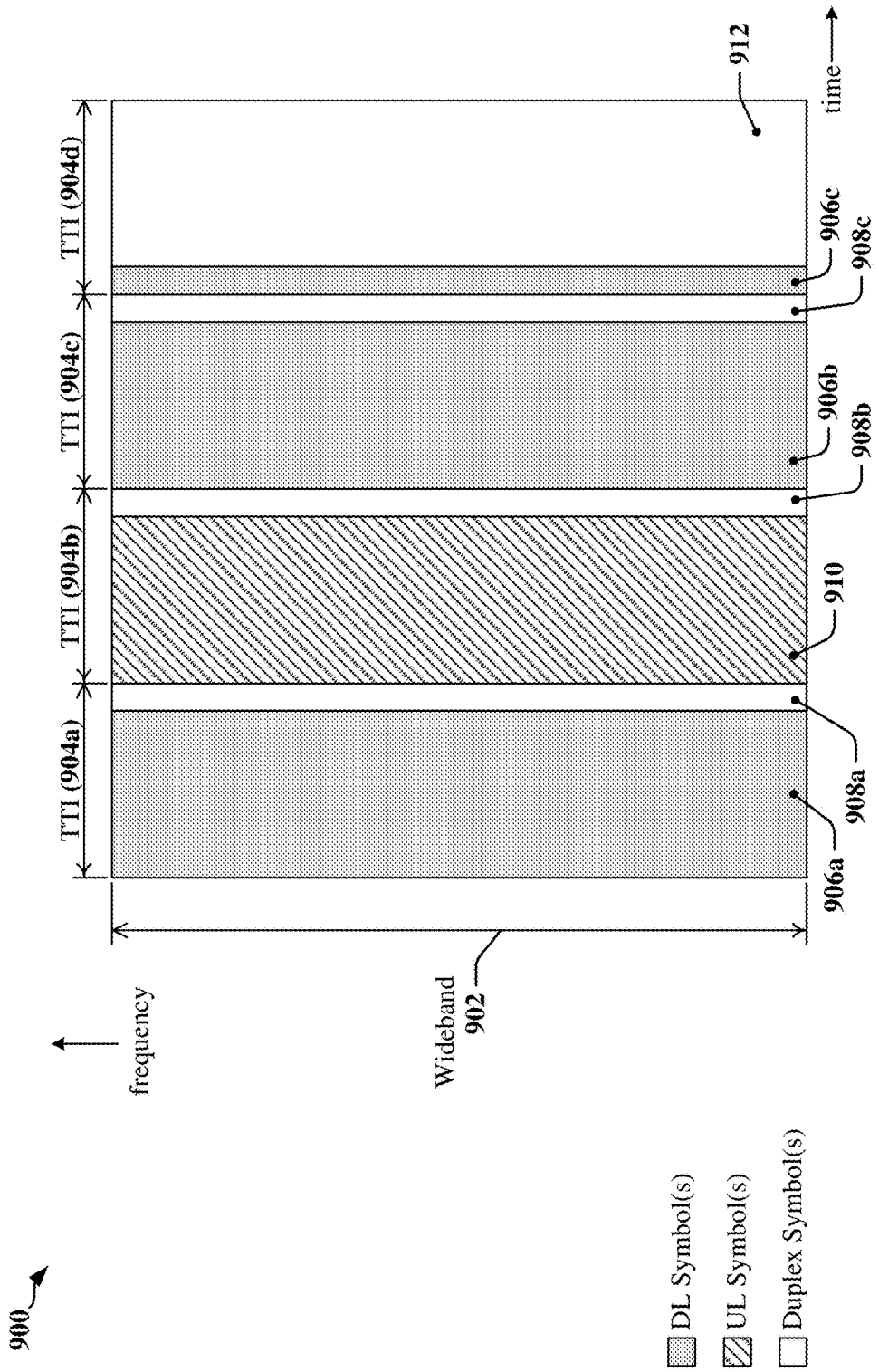
FIG. 9 illustrates a set of slotted duplex frames according to certain aspects disclosed herein.

FIG. 9 is a diagram that illustrates a set of slotted duplex frames 900 provided in accordance with certain aspects disclosed herein. The slotted duplex frames 900 can provide improved flexibility in systems that employ TDD. In the diagram, a frame may be transmitted in each of a plurality of TTIs 904a-904d. Downlink-centric frames are transmitted in the first TTI 904a and the third TTI 904c, while an uplink-centric frame is transmitted in the second TTI 904b. A third type of frame, characterized as a duplex frame, is transmitted in the fourth TTI 904d. Each frame terminates with one or more duplex symbols 908a, 908b, 908c, 912.

The duplex symbols 908a, 908b, 908c, 912 may permit data transmissions in the UL and the DL without requiring complex interference cancelation, using a sub-band duplex allocation of bandwidth to provide for efficient signaling in various scenarios. In various examples, different sets of slotted sub-band duplex frames may have frame structures that provide options for different sub-band patterns, including frame structures that enable configurability for duplex symbols with efficient spectral utilization and without requiring complex interference cancellation. Certain of these frame structures may support UL multi-priority scheduling that support low-latency applications. Slotted sub-band duplex frames may be deployed in access networks that use single carrier or carrier aggregation in a system that employs TDD.

According to certain aspects disclosed herein, each frame in the set of slotted duplex frames 900 includes a combination of symbols, which may include DL symbols 906a-906c, UL symbols 910, and/or duplex symbols 908a, 908b, 908c, 912. The DL symbols 906a-906c, UL symbols 910, and/or duplex symbols 908a, 908b, 908c, 912 may be combined to provide certain patterns within a frame structure in accordance with application requirements and/or to achieve certain performance characteristics.

In accordance with certain aspects, DL symbols 906a-906c can be aligned to DL timing, and UL symbols 910 may be aligned to UL timing.

The DL symbols 906a-906c may include certain designated DL sub-carriers and, in some instances, unassigned sub-carriers. Unassigned sub-carriers may include carriers that are not assigned for carrying either DL or UL signals. The UL symbols 910 may include certain designated UL sub-carriers and, in some instances, unassigned sub-carriers. The duplex symbols 908a, 908b, 908c, 912 may be provisioned using a pattern of certain sub-bands when the access network operates in a single carrier mode. The duplex symbols 908a, 908b, 908c, 912 may be provisioned using a pattern of certain component carriers when the access network operates in a CA mode. A signal pattern may be employed that includes both DL sub-carriers and UL sub-carriers, along with optional unassigned sub-carriers.

Figure 10:
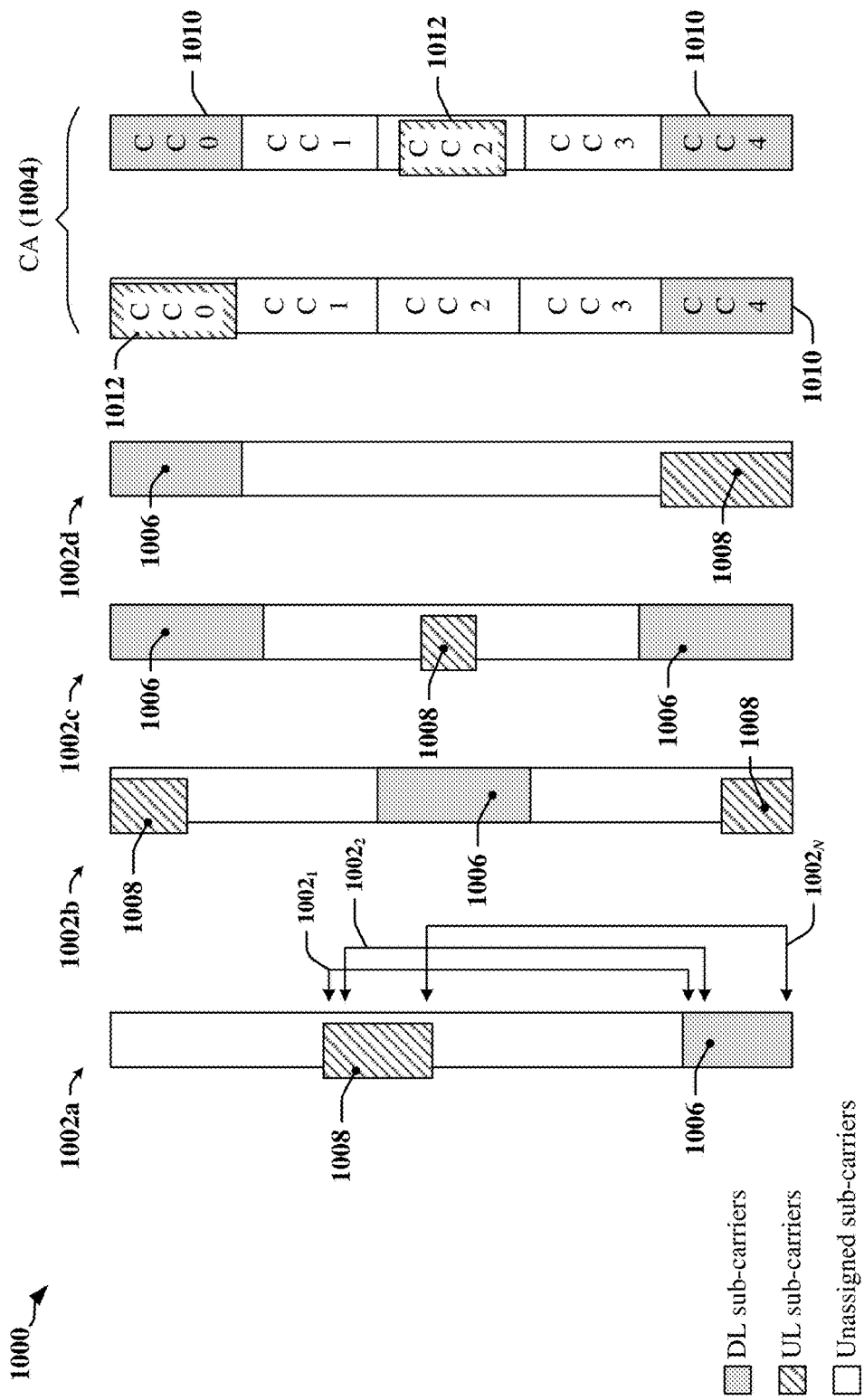
FIG. 10 illustrates examples of duplex symbol patterns according to certain aspects disclosed herein.
Figure 11:
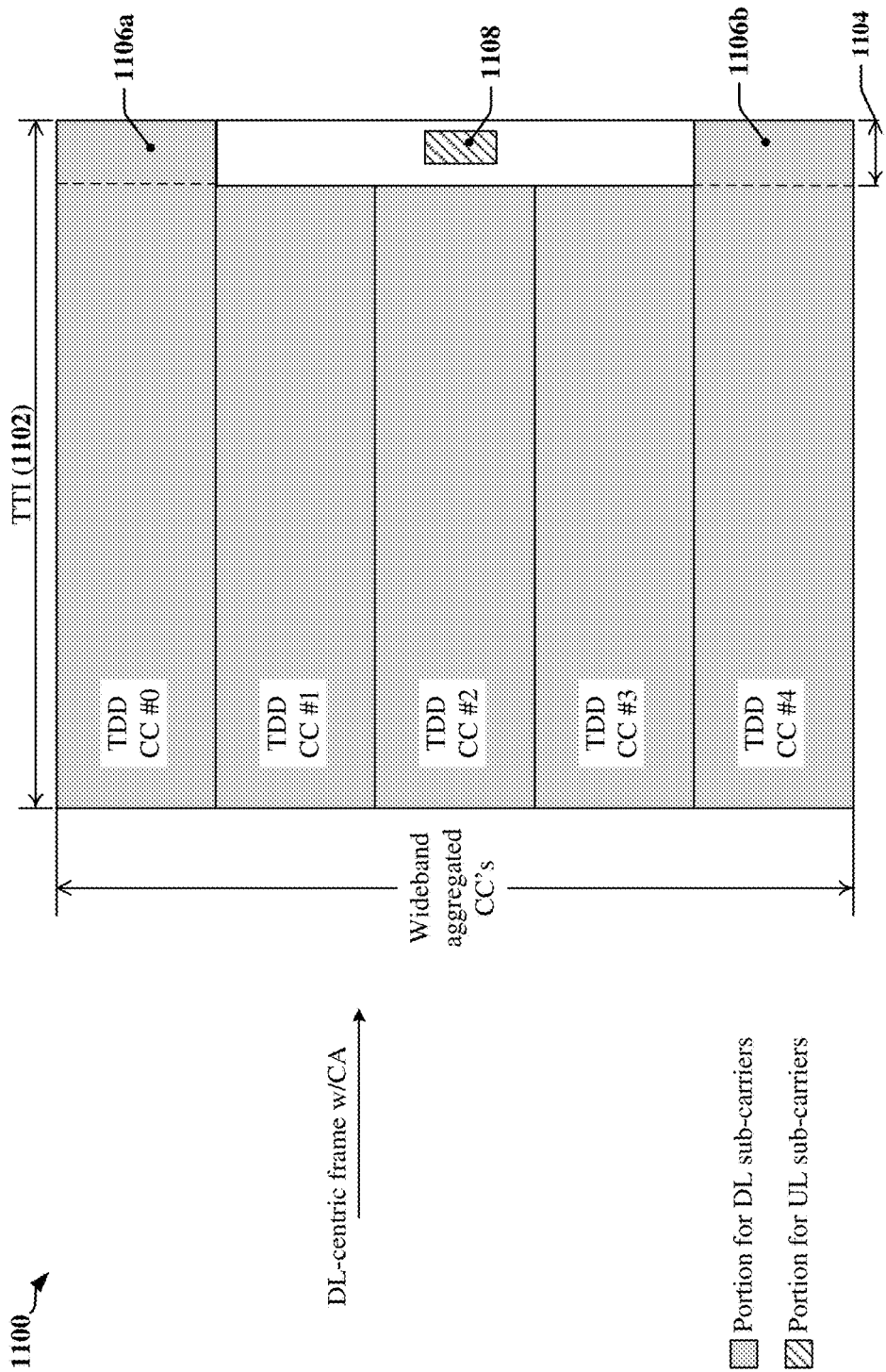
FIG. 11 illustrates an example of a downlink-centric frame according to certain aspects disclosed herein.

FIGS. 10 and 11 illustrate examples of duplex symbols that are configured in accordance with certain aspects disclosed herein. FIG. 10 illustrates different examples 1000 of OFDM duplex symbol patterns and FIG. 11 illustrates a DL-centric frame 1100 in a CA network. In the example of FIG. 10, each duplex symbol 1002a-1002d, 1004 includes unassigned sub-carriers (shown as white areas) that separate regions of DL sub-carriers 1006 and regions of UL sub-carriers 1008. DL sub-carriers 1006 and UL sub-carriers 1008 may be selected and/or paired in accordance with certain pre-defined pairing logic used for assignment to users of wide-band carriers. In some instances, the selection and/or pairing of DL sub-carriers 1006 and UL sub-carriers 1008 for duplex symbols 1002a-1002d may be indicated, and/or assigned by the network. For example, multiple users may be allocated pairings $1002_1$, $1002_2$, ... $1202_N$ of carriers of the DL sub-carriers 1006 and UL sub-carriers 1008.

For duplex symbols 1004 used in CA environments, the bandwidth is aggregated through component carriers (CCs) that can be adjacent or non-adjacent. In some instances, DL portions 1010 and UL portions 1012 of the duplex symbols 1004 may be selected such that one or more of their respective boundaries are coincident with the natural boundaries of a CC.

In some examples, duplex symbols 1002a-1002d, 1004 have DL sub-carriers 1006, 1010 aligned to DL timing, and UL sub-carriers 1008, 1012 aligned to UL timing. From the perspective of a UE, the UL timing may be advanced with respect to the DL timing. The network may configure the UEs serviced by a scheduling entity to cause UL transmissions to arrive at the antennas of the scheduling entity at the same time. Timing of UL symbols may be adjusted based on propagation latency measured based on certain network events. Each UE may compensate individually based on the timing events and, since the UEs may be subject to different propagation latencies, it is likely that a UE is configured to transmit UL symbols early. Each UL portion 1008, 1012 may be isolated by preventing use of the carriers in the UL portion 1008, 1012 in one or two preceding symbols. Accordingly, different types of duplex symbols 1002a-1002d, 1004 may be configured in an application.

In FIG. 11, the complete DL-centric frame 1100 is configured to include a pair of duplex symbols 1104. The use of the duplex symbols 1104 provides improved spectral efficiency by, for example, permitting an ACK or negative acknowledgement (NAK) to be transmitted in an UL transmission 1108 that may occur while DL bandwidth 1106a, 1106b is provided to be used for transmitting scheduling and/or other control or common information. The UL transmission 1108 may occupy the final symbol, within the span of 2-symbols 1104 in order to accommodate timing advances due to propagation latency.

Figure 12:
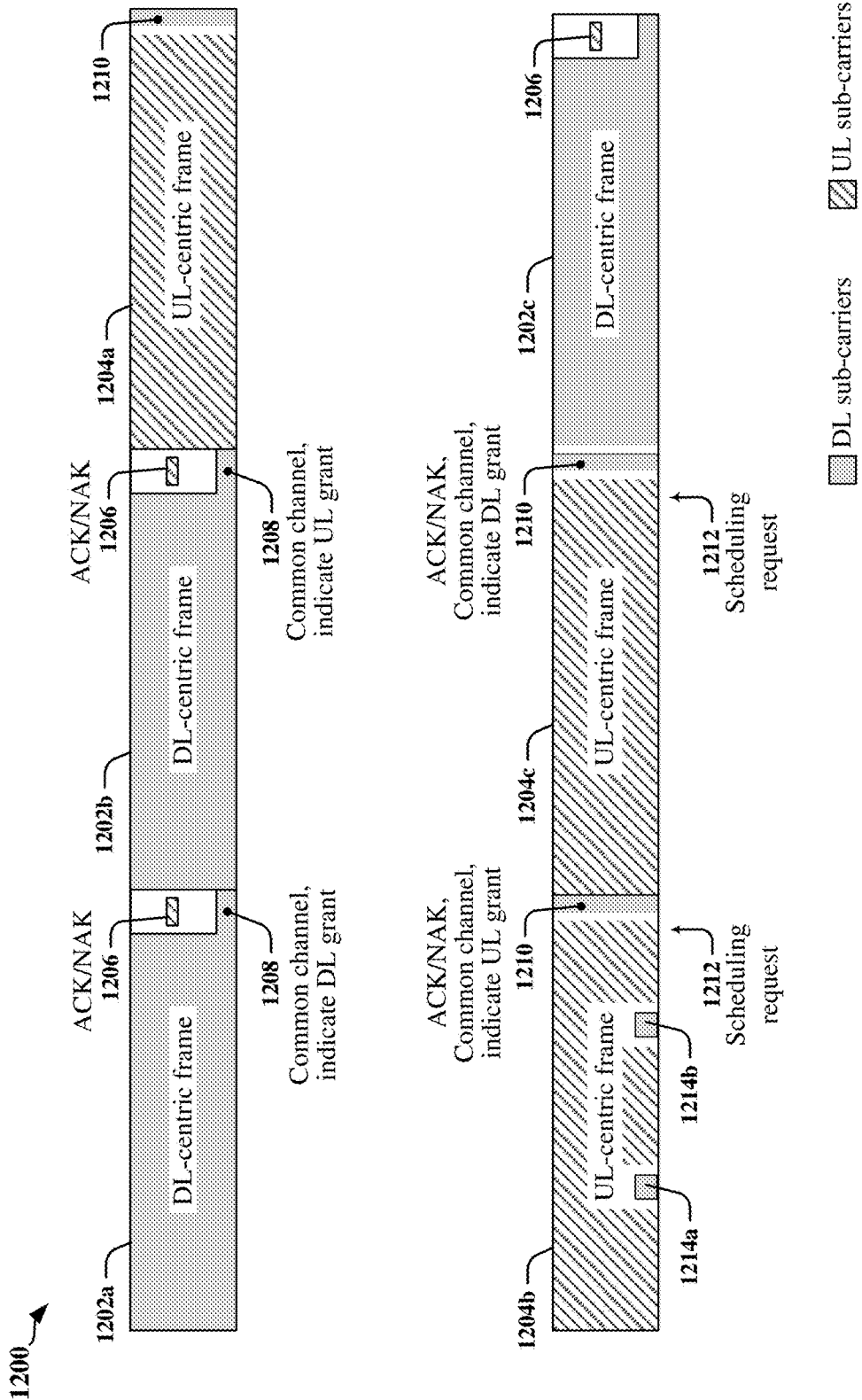
FIG. 12 illustrates an example of the use of duplex symbols in multiple frames in accordance with certain aspects disclosed herein.

FIG. 12 provides a multi-frame example 1200 that illustrates configurability, and certain tradeoffs that may be made between spectral utilization and signaling latency for both control and data signals. The frames 1202a-1202c, 1204a-1204c include one or more duplex symbols. In some instances, the duplex symbols may improve latency while certain UL-centric frames 1204b are being transmitted, through the inclusion of DL transmission allocations 1214a, 1214b that may be used for scheduling or other control purposes. In some instances, duplex symbols may improve spectral efficiency for certain DL-centric frames 1202a-1202c by permitting DL transmissions while an ACK or negative acknowledgement (NAK) transmission 1206 occurs on the uplink. It will be appreciated that the frames 1202a-1202c, 1204a-1204c include bandwidth for ACK/NAK transmissions 1206, 1210.

While the configuration of the frames 1202a-1202c, 1204a-1204c can be selected according to application and/or network needs, the example 1200 depicted in FIG. 4 provides efficient control signaling that always acknowledges data reception by the end of a current frame, and that pre-schedules grants for the next frame 1202a-1202c, 1204a-1204c. Uplink multi-priority scheduling may be implemented to support low-latency applications in a system that employs TDD.

According to certain aspects, a scheduling entity may be adapted to accommodate the use of duplex symbols. Issues may arise when certain frequencies are used for duplex symbols because of differences in the power levels of UL and DL signals. For example, a transmitter of a base station may transmit on the downlink at 43 dBm, or 40 Watts (40 W), and a receiver of the base station may have a −110 dBm sensitivity to signals received in uplink transmissions. In this example, a 150 dB isolation may be required between uplink and downlink communications. Some types of transmission may not use or need a large portion of the bandwidth provided in the network and, as such, it can be wasteful of capacity if the entire wideband is allocated for these types of transmissions. Such transmissions may include synchronization and common overhead and/or broadcast messages. In addition, edge rates may be associated with low spectral efficiency and thus warrant less bandwidth.

According to certain aspects, a subordinate entity may be adapted to accommodate the use of duplex symbols. In a subordinate entity, such as a mobile terminal, wideband usage may be wasteful of spectrum when the uplink is power constrained, including when wideband usage involves control transmissions such as ACK or CQI transmissions.

Certain issues associated with the use of duplex symbols in an FDD wireless network may be alleviated using control signal multiplexing, waveform adaptation, and antenna multiplexing.

Figure 13:
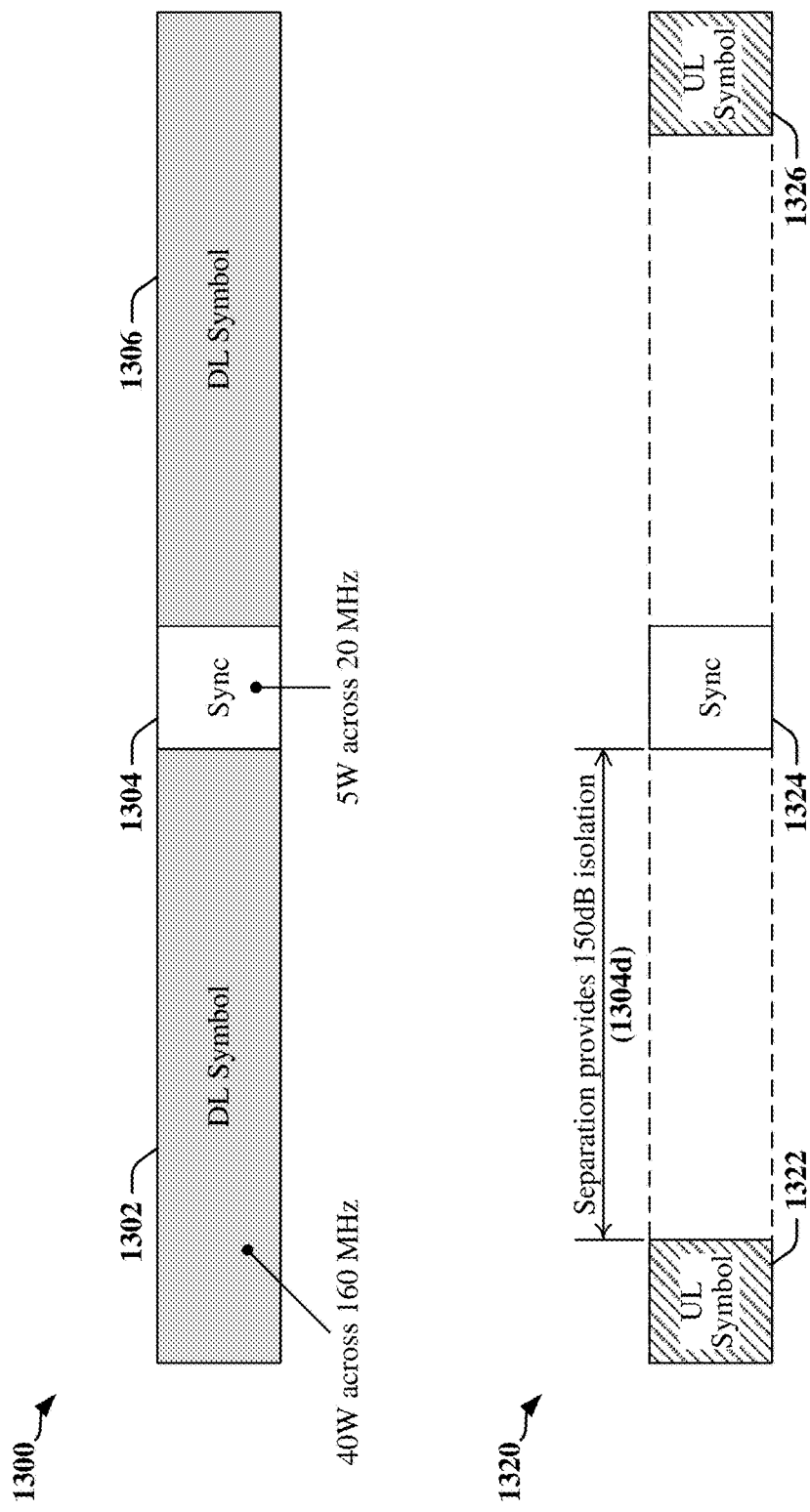
FIG. 13 illustrates an example of control signal multiplexing in accordance with certain aspects disclosed herein.

With reference now to FIG. 13, control signal multiplexing may be used in some instances to multiplex DL sync and/or broadcast control messages with UL control messages. In conventional or legacy systems, and as illustrated generally at 1300, downlink control signaling 1304 is typically multiplexed with data channels 1302, 1306. In such systems, total transmit power is shared among control and data channels 1302, 1304, 1306 to the detriment of link budget. As discussed herein, synchronization and broadcast control signaling 1304 typically include small payloads and can be wasteful across wideband channels. Multiplexing synchronization and broadcast control on a duplex symbol can enable more power to be allocated to synchronization and broadcast control channels than may be allocated in legacy systems, and may provide an improved link budget.

Waveform Processing on Duplex Symbols

Figure 14:
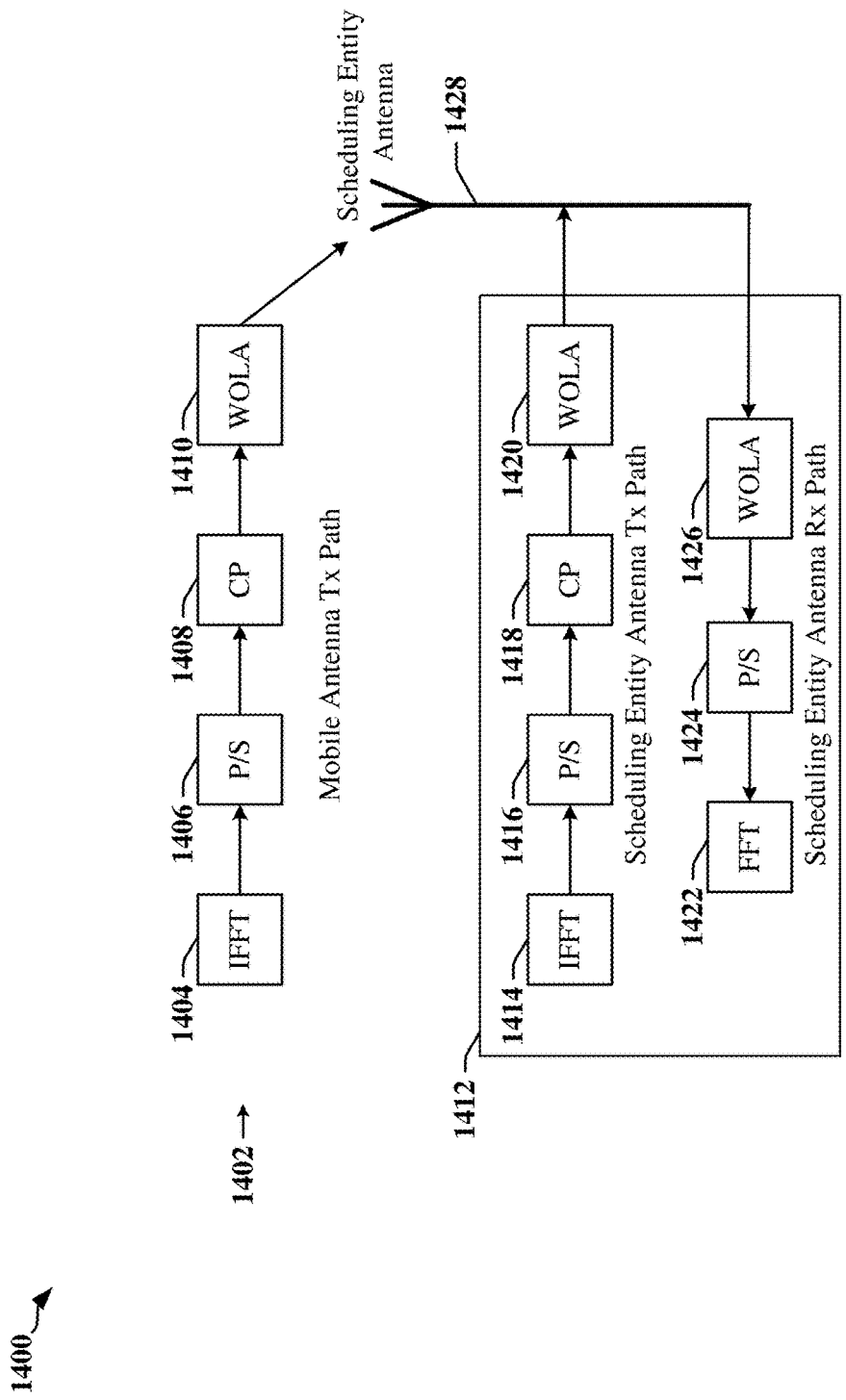
FIG. 14 illustrates an example of a system that employs waveform adaptation techniques in accordance with certain aspects disclosed herein.
Figure 15:
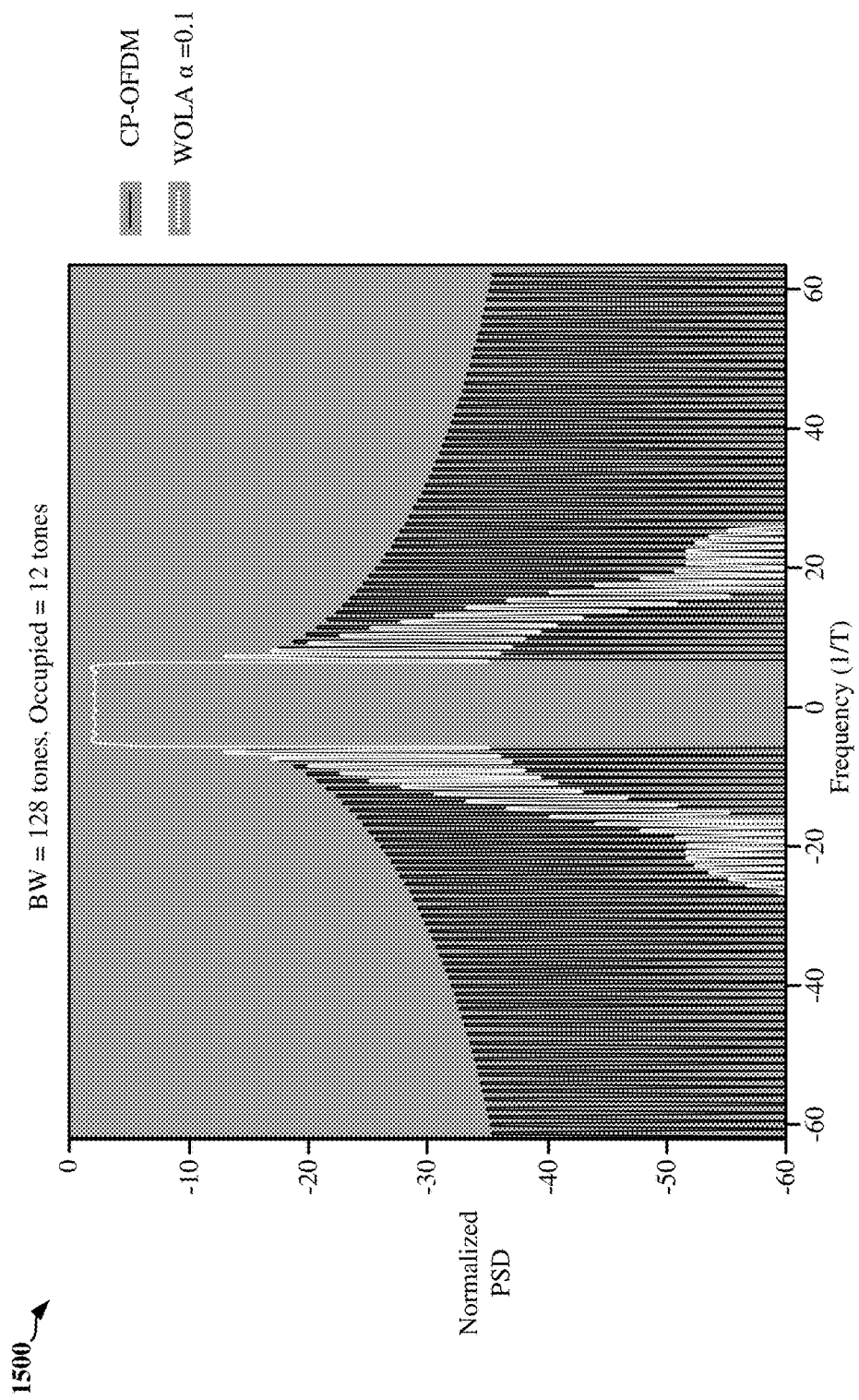
FIG. 15 graphically illustrates the impact of certain waveform adaptation techniques employed in accordance with certain aspects disclosed herein.

With reference to FIGS. 14 and 15, certain waveform adaptation techniques may be employed to provide additional waveform processing on duplex symbols. In some instances, a weighted overlap-add (WOLA) filter bank processor 1410, 1420, 1426 may be implemented to adapt duplex symbol waveforms. WOLA or time-domain filtering can be used to significantly reduce roll-off characteristics of UL and/or DL signals and can reduce DL/UL signal interference. FIG. 14 illustrates an example of a system 1400 in which out-of-band attenuation may be achieved using WOLA filtering, where a scheduling entity 1412 is in communication with a second entity 1402, which may be a subordinate entity such as a UE. In other examples, the first entity 1412 and the second entity 1402 may be peer devices, or any combination of scheduling entities and non-scheduling entities. FIG. 15 includes a graph 1500 that illustrates the impact of waveform adaptation techniques employed in accordance with certain aspects disclosed herein.

Figure 16:
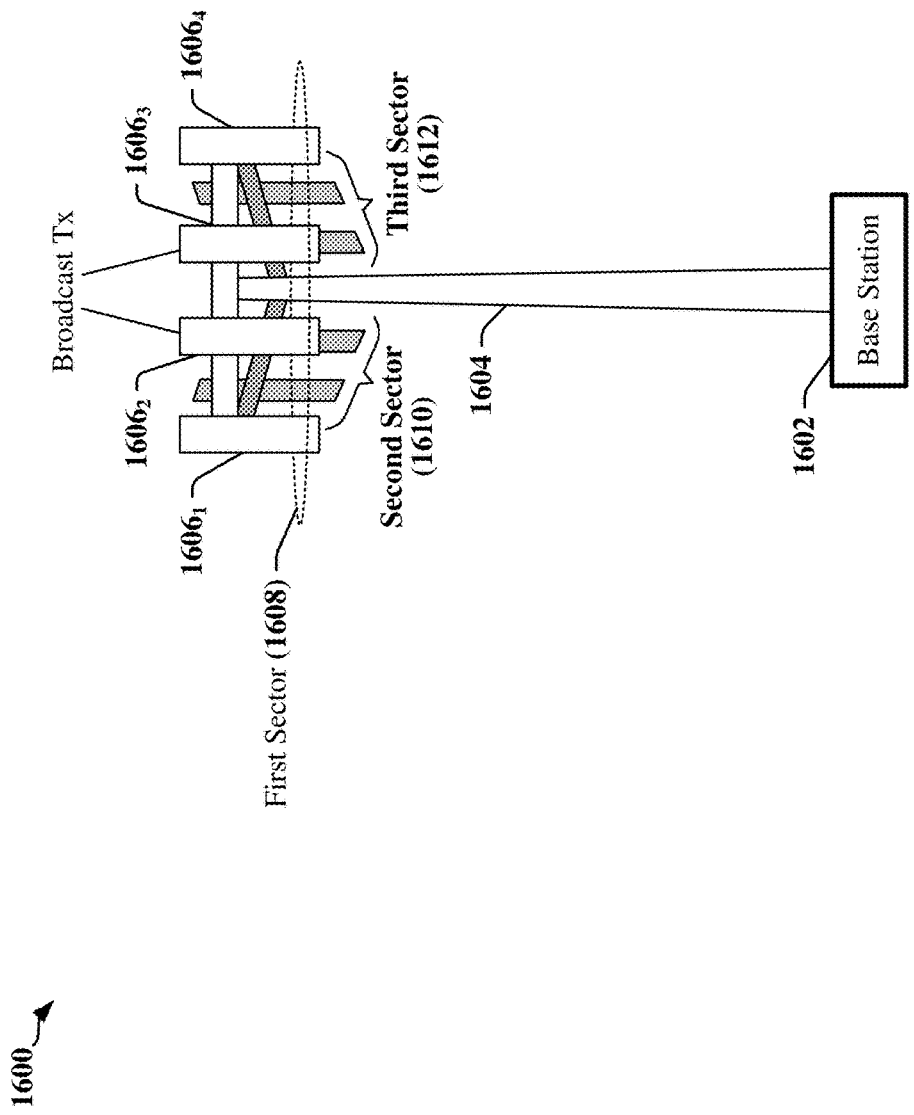
FIG. 16 illustrates antenna multiplexing in accordance with certain aspects disclosed herein.

FIG. 16 illustrates a network entity 1600 that supports antenna multiplexing. The network entity 1600 may include a base station 1602 and a multi-sector cell tower 1604 that supports one or more antenna arrays 1608, 1610, 1612 for communicating within a cell of a wireless network. The base station 1602 may cooperate with the multi-sector cell tower 1604 to communicate in each sector of the cell by assigning one of the arrays 1608, 1610, 1612 for each sector. Each array 1608, 1610, 1612 may include a plurality of antennas. In some instances, the antennas may be grouped, arranged, and/or operated to enable the use of MIMO technology. In the illustrated example, the network entity 1600 provides 4 antennas $1606_1$-$1606_4$ in an antenna array 1608 used for a first sector. According to certain aspects disclosed herein, the antenna array 1608 of the first sector may be configured such that DL broadcasts or control signaling are transmitted using a sub-group of inner antennas $1606_2$, $1606_3$ to provide widebeam synthesis, while UL signals may be received using outer antennas $1606_1$, $1606_4$ configured to obtain maximal receive diversity.

Additional Descriptions of Certain Aspects

Figure 17:
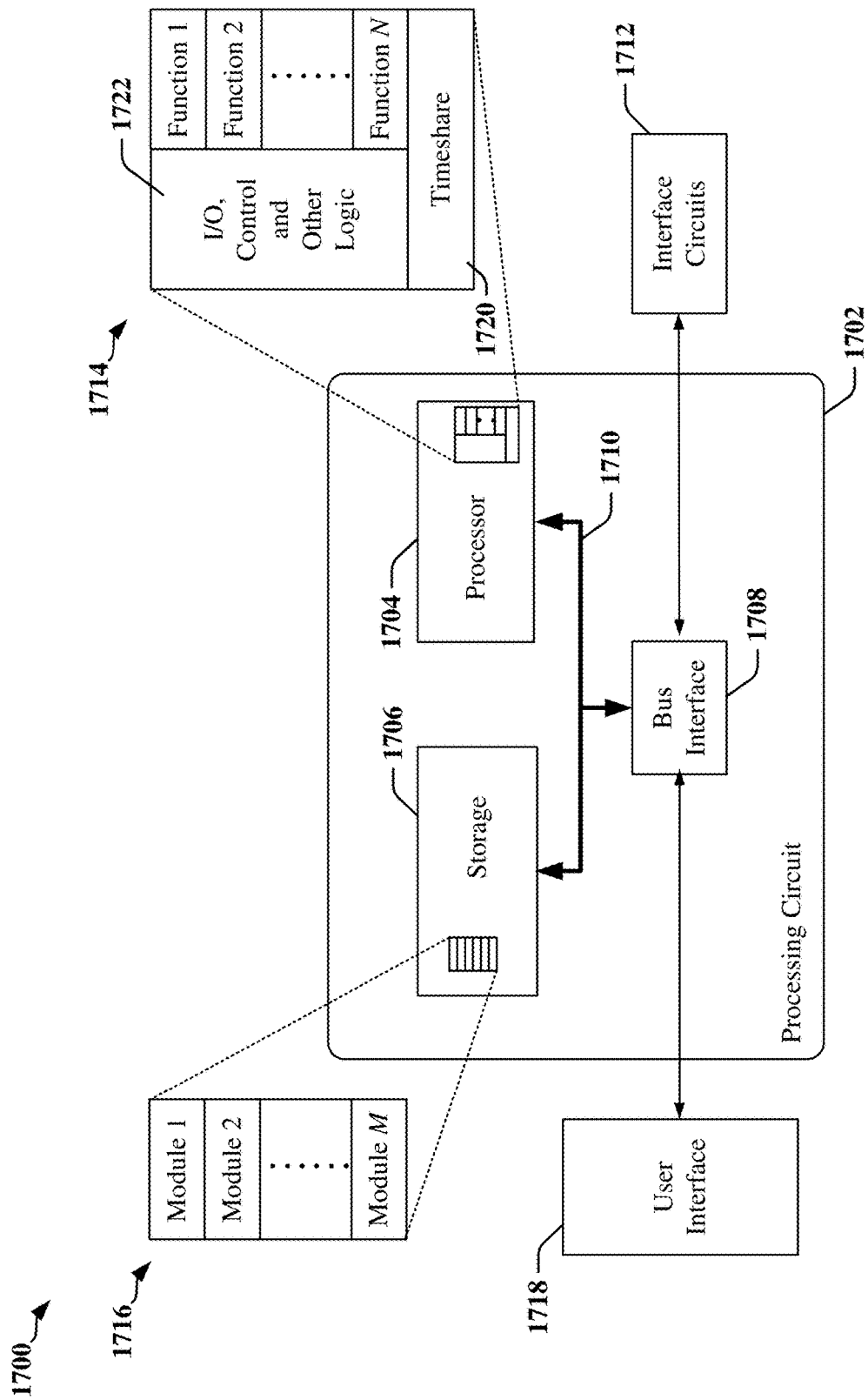
FIG. 17 illustrates an example of an apparatus employing a processing circuit that may be adapted according to certain aspects disclosed herein.

FIG. 17 is a conceptual diagram illustrating an example of a hardware implementation for an apparatus 1700 employing a processing circuit 1702 that may be configured to perform one or more functions disclosed herein. In accordance with various aspects of the disclosure, an element, or any portion of an element, or any combination of elements as disclosed herein may be implemented using the processing circuit 1702. The processing circuit 1702 may include one or more processors 1704 that are controlled by some combination of hardware and software modules. Examples of processors 1704 include microprocessors, microcontrollers, DSPs, FPGAs, PLDs, state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more transceivers 1712. A transceiver 1712 may be provided for each networking technology supported by the processing circuit 1702. In some instances, multiple networking technologies may share some or all of the circuitry or processing modules found in a transceiver 1712. Each transceiver 1712 provides a means for communicating with various other apparatus over a transmission medium. Depending upon the nature of the apparatus 1700, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer readable medium. The external computer-readable medium and/or storage 1706 may include a non-transitory computer-readable medium. A non-transitory computer-readable medium includes, by way of example, a magnetic storage device (e.g., hard disk, floppy disk, magnetic strip), a smart card, a flash memory device (e.g., a "flash drive," a card, a stick, or a key drive), random access memory (RAM), a read only memory (ROM), a programmable read only memory (PROM), an erasable programmable read only memory (EPROM), an electrically erasable programmable read only memory (EEPROM), optical disk storage, magnetic disk storage or other magnetic storage devices, one or more hardware registers, a removable disk, and any other suitable medium for storing software and/or instructions that may be accessed and read by a computer. Disk and disc, as used herein, includes compact disc (CD), laser disc, optical disc, digital versatile disc (DVD), and floppy disk where disks usually reproduce data magnetically, while discs reproduce data optically with lasers. The computer-readable medium and/or storage 1706 may also include, by way of example, a carrier wave, a transmission line, and any other suitable medium for transmitting software and/or instructions that may be accessed and read by a computer. Computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The computer-readable medium and/or storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as the transceiver 1712, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceiver 1712, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
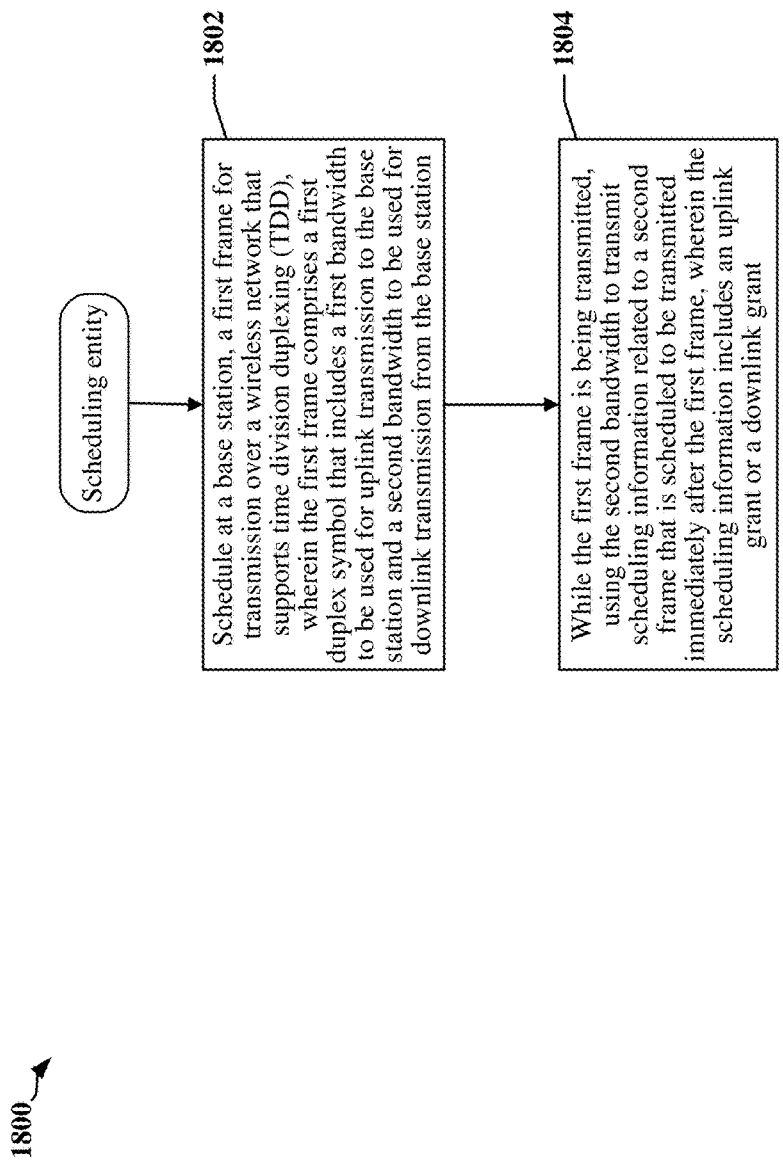
FIG. 18 is a first flow chart of a method of wireless communication in accordance with certain aspects disclosed herein.

FIG. 18 is a flow chart 1800 of a method of wireless communication. The method may be performed by a scheduling entity.

At block 1802, the scheduling entity may schedule a first frame for transmission over a wireless network that supports TDD. The first frame may include a first duplex symbol that provides or includes a first bandwidth to be used for uplink transmission to the scheduling entity and a second bandwidth to be used for downlink transmission from the scheduling entity.

At block 1804, the scheduling entity may use the second bandwidth to transmit scheduling information while the first frame is being transmitted. The scheduling information may be related to a second frame that is scheduled to be transmitted immediately after the first frame. The scheduling information may include an uplink grant or a downlink grant.

In one example, the first frame is a downlink-centric frame, and a payload of the first frame may be transmitted in a plurality of downlink symbols. An ACK or a NAK responsive to the payload may be received. The ACK or the NAK may be received using the first bandwidth. The scheduling information may be transmitted while the ACK or the NAK is being received. The first frame may have a second duplex symbol that includes an unused bandwidth corresponding in frequency to the first bandwidth. The second duplex symbol immediately precedes the first duplex symbol in transmission.

In another example, the first frame is an uplink-centric frame, and a payload of the first frame may be received in a plurality of symbols. The scheduling information may be transmitted using the second bandwidth when the first duplex symbol is included in the plurality of symbols. An ACK or a NAK may be transmitted after the payload is completely received. The plurality of symbols may include one or more uplink symbols.

In some instances, the scheduling information includes a high-priority grant.

The scheduling entity may configure the first frame based on previous scheduling information provided in a third frame, where the third frame immediately precedes the first frame in transmission.

In some instances, the duplex symbol is an OFDM symbol. The wireless network that supports TDD may be a single-carrier network, and the first bandwidth may include a first sub-band of the single carrier, while the second bandwidth includes a second sub-band of the single carrier.

In some instances, the wireless network that supports TDD employs carrier aggregation to provide an aggregated bandwidth. The first bandwidth may include a first carrier component of the aggregated bandwidth and the second bandwidth may include a second carrier component of the aggregated bandwidth. The first bandwidth may be aligned with a boundary of the first carrier component. The second bandwidth may be aligned with a boundary of the second carrier component.

Figure 19:
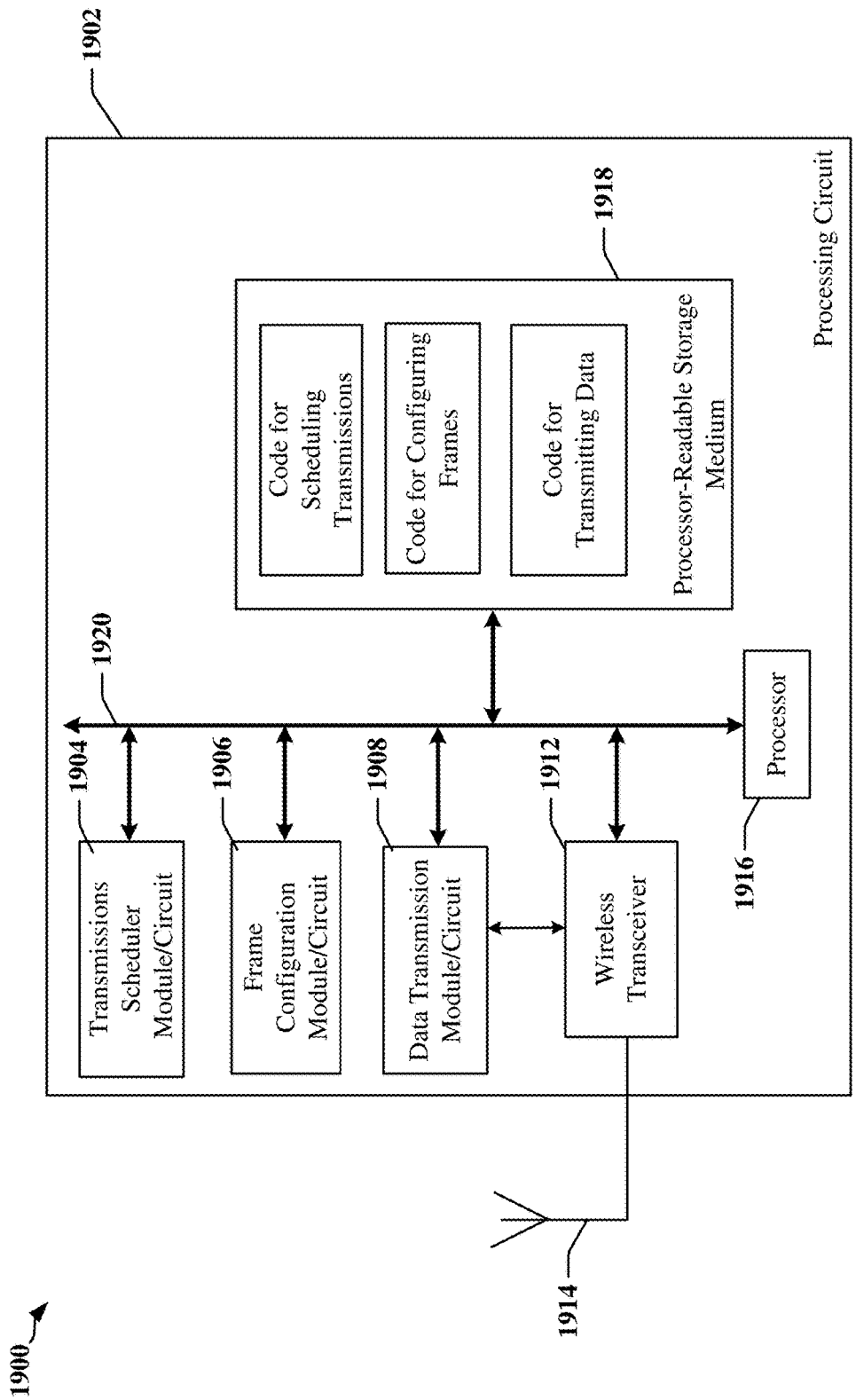
FIG. 19 illustrates a first example of a hardware implementation for an apparatus employing a processing circuit adapted according to certain aspects disclosed herein.

In some examples, the scheduling entity may transmit one or more broadcast messages or control signals from the scheduling entity. The one or more broadcast messages or control signals may be multiplexed in the first duplex symbol with one or more control messages or low data transmissions received the scheduling entity. A waveform processor may be used to modify a characteristic of one or more signals carried in the first duplex symbol. A first unidirectional symbol may be transmitted without using the waveform processor to modify the characteristic of signals in the first unidirectional symbol, and a second unidirectional symbol may be received where the second unidirectional symbol has been transmitted without using the waveform processor to modify the characteristic of signals in the second unidirectional symbol. The waveform processor may include a weighted overlap-add filter bank processor that improves separation between the uplink transmission and the downlink transmission FIG. 19 is a diagram illustrating a first example of a hardware implementation for an apparatus 1900 employing a processing circuit 1902 according to certain aspects disclosed herein. The processing circuit typically has a processor 1916 that may include one or more of a microprocessor, microcontroller, digital signal processor, a sequencer and a state machine. The processing circuit 1902 may be implemented with a bus architecture, represented generally by the bus 1920. The bus 1920 may include any number of interconnecting buses and bridges depending on the specific application of the processing circuit 1902 and the overall design constraints. The bus 1920 links together various circuits including one or more processors and/or hardware modules, represented by the processor 1916, the modules or circuits 1904, 1906 and 1908, and wireless transceiver circuits 1912 configurable to communicate through an antenna system 1914 and the computer-readable storage medium 1918. The bus 1920 may also link various other circuits such as timing sources, peripherals, voltage regulators, and power management circuits, which are well known in the art, and therefore, will not be described any further.

The processor 1916 is responsible for general processing, including the execution of software stored on the computer-readable storage medium 1918. The software, when executed by the processor 1916, causes the processing circuit 1902 to perform the various functions described supra for any particular apparatus. The computer-readable storage medium 1918 may also be used for storing data that is manipulated by the processor 1916 when executing software, including data decoded from symbols transmitted over the antenna system 1914, which may be configured as data lanes and clock lanes. The processing circuit 1902 further includes at least one of the modules 1904, 1906 and 1908. The modules 1904, 1906 and 1908 may be software modules running in the processor 1916, resident/stored in the computer-readable storage medium 1918, one or more hardware modules coupled to the processor 1916, or some combination thereof. The modules 1904, 1906 and/or 1908 may include microcontroller instructions, state machine configuration parameters, or some combination thereof.

In one configuration, the apparatus 1900 for wireless communication includes a module and/or circuit 1904 that is configured to schedule a first frame for transmission over a wireless network that supports TDD, a module and/or circuit 1906 configured to configure the first frame, and a module and/or circuit 1908 configured to transmit data in the first frame in accordance with the scheduling information.

In one example, the apparatus includes circuits or modules 1904 configured to schedule a first frame for transmission over the wireless network that supports TDD. The first frame may be configured using configuration circuits or modules 1906 to include a first duplex symbol that includes a first bandwidth to be used for uplink transmission to the scheduling entity and a second bandwidth to be used for downlink transmission from the scheduling entity. The apparatus includes circuits or modules 1908, 1912, 1914 configured to transmit scheduling information related to a second frame that is scheduled to be transmitted immediately after the first frame. The scheduling information may be transmitted using the second bandwidth to transmit the scheduling information while the first frame is being transmitted. The scheduling information may include an uplink grant or a downlink grant.

Figure 20:
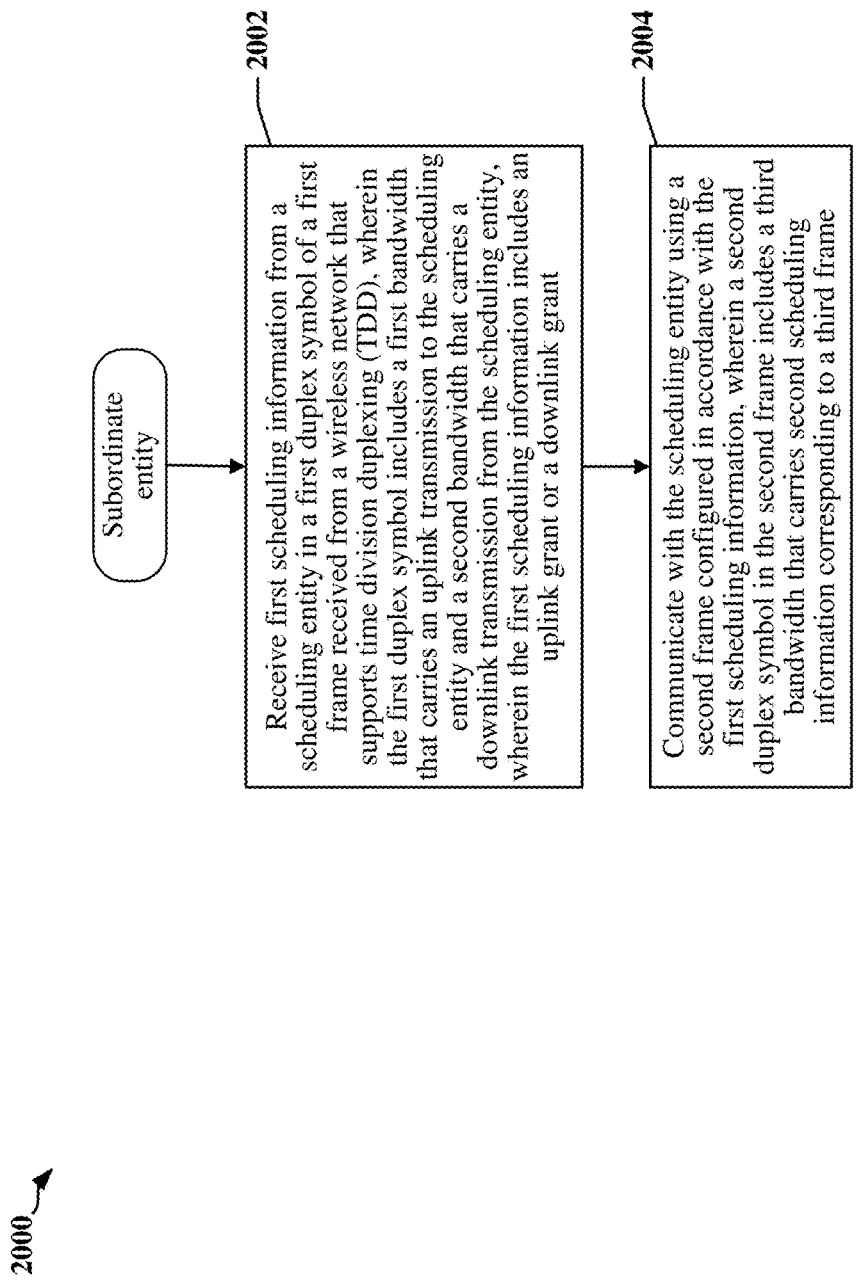
FIG. 20 is a second flow chart of a method of wireless communication in accordance with certain aspects disclosed herein.

FIG. 20 is a flow chart 2000 of a method of wireless communication. The method may be performed by a subordinate device or entity.

At block 2002, the subordinate device or entity may receive first scheduling information from a scheduling entity in a first duplex symbol of a first frame received from a wireless network that supports TDD. The first duplex symbol may include a first bandwidth that carries an uplink transmission to the scheduling entity and a second bandwidth that carries a downlink transmission from the scheduling entity. The first scheduling information may include an uplink grant or a downlink grant.

At block 2004, the scheduling device or entity may communicate with the scheduling entity using a second frame configured in accordance with the first scheduling information. A second duplex symbol in the second frame may include a third bandwidth that carries second scheduling information corresponding to a third frame.

In one example, the first frame is a downlink-centric frame, and a payload of the first frame may be received in a plurality of downlink symbols. An ACK or a NAK responsive to the payload may be transmitted. The ACK or the NAK may be transmitted using the first bandwidth. The scheduling information may be received while transmitting the ACK or the NAK. The first frame may have a second duplex symbol that may include an unused bandwidth corresponding in frequency to the first bandwidth. The second duplex symbol immediately precedes the first duplex symbol in transmission.

In another example, the first frame is an uplink-centric frame, and a payload of the first frame may be transmitted in a plurality of symbols. The scheduling information may be received using the second bandwidth when the first duplex symbol is included in the plurality of symbols. The plurality of symbols may include one or more uplink symbols. An ACK or a NAK may be transmitted after the payload is completely received.

In some instances, the scheduling information includes a high-priority grant.

The first frame may be configured based on previous scheduling information provided in a fourth frame, where the fourth frame immediately precedes the first frame in transmission.

In some instances, the duplex symbol is an OFDM symbol. The wireless network that supports TDD may be a single-carrier network, and the first bandwidth may include a first sub-band of the single carrier, while the second bandwidth may include a second sub-band of the single carrier.

In some instances, the wireless network that supports TDD employs carrier aggregation to provide an aggregated bandwidth. The first bandwidth may include a first carrier component of the aggregated bandwidth and the second bandwidth may include a second carrier component of the aggregated bandwidth. The first bandwidth may be aligned with a boundary of the first carrier component. The second bandwidth may be aligned with a boundary of the second carrier component.

Figure 21:
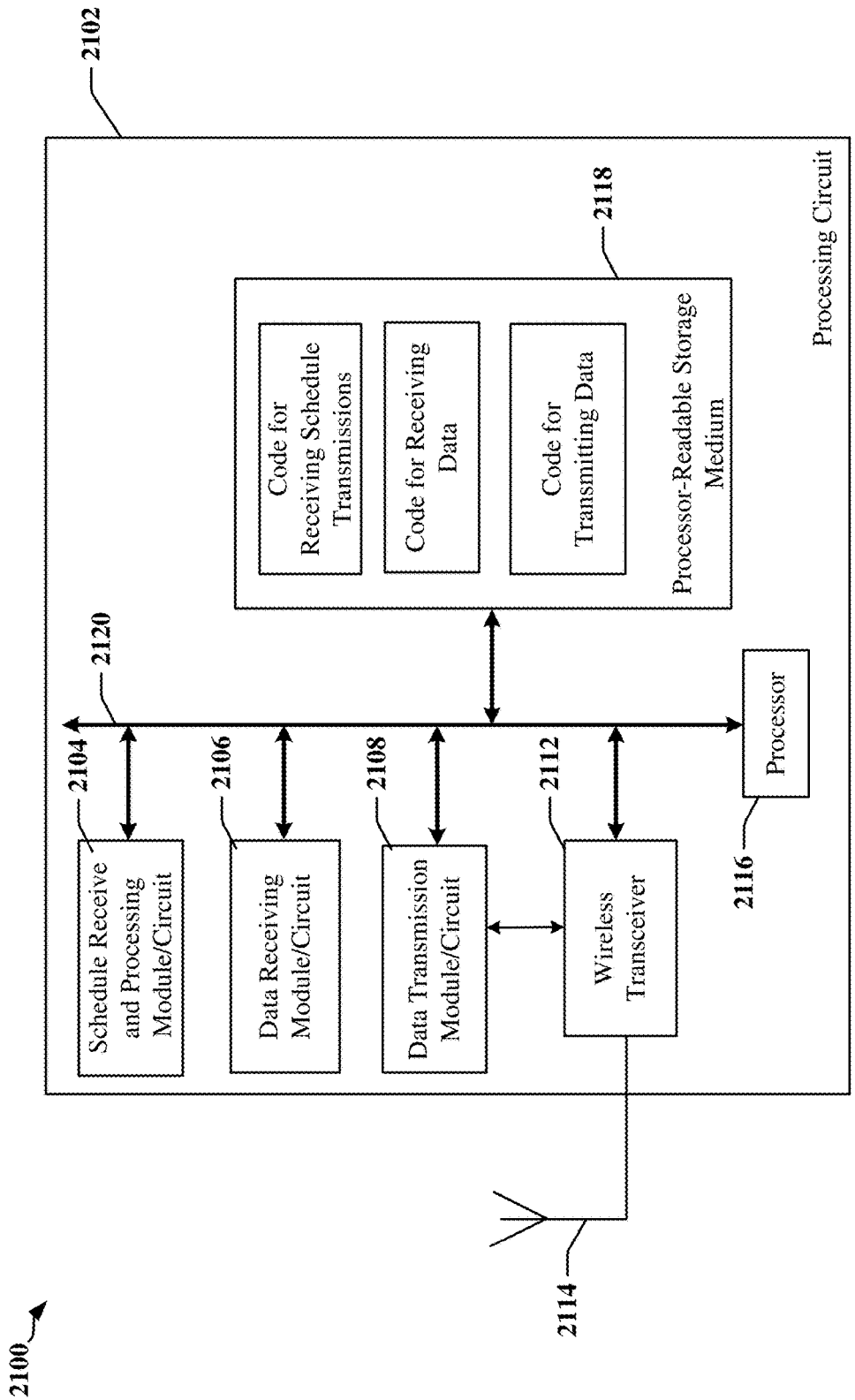
FIG. 21 illustrates a second example of a hardware implementation for an apparatus employing a processing circuit adapted according to certain aspects disclosed herein.

FIG. 21 is a diagram illustrating a second example of a hardware implementation for an apparatus 2100 employing a processing circuit 2102 according to certain aspects disclosed herein. The processing circuit typically has a processor 2116 that may include one or more of a microprocessor, microcontroller, digital signal processor, a sequencer and a state machine. The processing circuit 2102 may be implemented with a bus architecture, represented generally by the bus 2120. The bus 2120 may include any number of interconnecting buses and bridges depending on the specific application of the processing circuit 2102 and the overall design constraints. The bus 2120 links together various circuits including one or more processors and/or hardware modules, represented by the processor 2116, the modules or circuits 2104, 2106 and 2108, and wireless transceiver circuits 2112 configurable to communicate through an antenna system 2114 and the computer-readable storage medium 2118. The bus 2120 may also link various other circuits such as timing sources, peripherals, voltage regulators, and power management circuits, which are well known in the art, and therefore, will not be described any further.

The processor 2116 is responsible for general processing, including the execution of software stored on the computer-readable storage medium 2118. The software, when executed by the processor 2116, causes the processing circuit 2102 to perform the various functions described supra for any particular apparatus. The computer-readable storage medium 2118 may also be used for storing data that is manipulated by the processor 2116 when executing software, including data decoded from symbols transmitted over the antenna system 2114, which may be configured as data lanes and clock lanes. The processing circuit 2102 further includes at least one of the modules 2104, 2106 and 2108. The modules 2104, 2106 and 2108 may be software modules running in the processor 2116, resident/stored in the computer-readable storage medium 2118, one or more hardware modules coupled to the processor 2116, or some combination thereof. The modules 2104, 2106 and/or 2108 may include microcontroller instructions, state machine configuration parameters, or some combination thereof In one configuration, the apparatus 2100 for wireless communication includes a module and/or circuit 2104 that is configured to receive and process scheduling information for a next frame on a wireless network that supports TDD, a module and/or circuit 2106 configured to receive data from the next frame in accordance with the scheduling information, and a module and/or circuit 2108 configured to transmit data in the next frame in accordance with the scheduling information.

In one example, the apparatus includes a module and/or circuit 2104 configured to receive first scheduling information from a scheduling entity in a first duplex symbol of a first frame received from a wireless network that supports TDD, where the first duplex symbol includes a first bandwidth that carries an uplink transmission to the scheduling entity and a second bandwidth that carries a downlink transmission from the scheduling entity, and a module and/or circuit 2106, 2108 configured to communicate with the scheduling entity using a second frame configured in accordance with the first scheduling information. A second duplex symbol in the second frame may include a third bandwidth that carries second scheduling information corresponding to a third frame. The first scheduling information may include an uplink grant or a downlink grant.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
    scheduling at a scheduling entity, a first frame for transmission over a wireless network that supports time division duplexing, wherein the first frame comprises a first duplex symbol that includes a first bandwidth to be used for uplink transmission to the scheduling entity and a second bandwidth to be used for downlink transmission from the scheduling entity; and while the first frame is being transmitted, using the second bandwidth to transmit scheduling information related to a second frame that is scheduled to be transmitted immediately after the first frame, wherein the scheduling information includes an uplink grant or a downlink grant.

2. The method of claim 1, wherein the first frame is a downlink-centric frame, and further comprising:

transmitting a payload of the first frame in a plurality of downlink symbols;

receiving an acknowledgement (ACK) or a negative acknowledgement (NAK) responsive to the payload, wherein the ACK or the NAK is received using the first bandwidth; and transmitting the scheduling information while receiving the ACK or the NAK.

3. The method of claim 2, wherein the first frame comprises a second duplex symbol that includes an unused bandwidth corresponding in frequency to the first bandwidth, and wherein the second duplex symbol immediately precedes the first duplex symbol in transmission.

4. The method of claim 1, wherein the first frame is an uplink-centric frame, and further comprising:

receiving a payload of the first frame in a plurality of symbols;

transmitting the scheduling information using the second bandwidth, wherein the first duplex symbol is included in the plurality of symbols; and transmitting an ACK or a NAK after the payload is completely received.

5. The method of claim 4, wherein the plurality of symbols comprises one or more uplink symbols.

6. The method of claim 1, wherein the scheduling information includes a high-priority grant.

7. The method of claim 1, further comprising:

configuring the first frame based on previous scheduling information provided in a third frame, wherein the third frame immediately precedes the first frame in transmission.

8. The method of claim 1, wherein the first duplex symbol comprises an orthogonal frequency division multiplexing symbol.

9. The method of claim 1, wherein the wireless network communicates using a single carrier, and wherein the first bandwidth includes a first sub-band of the single carrier and the second bandwidth includes a second sub-band of the single carrier.

10. The method of claim 1, wherein the wireless network employs carrier aggregation to provide an aggregated bandwidth, and wherein the first bandwidth includes a first carrier component of the aggregated bandwidth and the second bandwidth includes a second carrier component of the aggregated bandwidth.

11. The method of claim 10, wherein the first bandwidth is aligned with a boundary of the first carrier component, and the second bandwidth is aligned with a boundary of the second carrier component.

12. The method of claim 1, further comprising:

allocating at least one antenna in an antenna array for broadcast transmissions by the scheduling entity; and allocating a plurality of remaining antennas for receiving transmissions at the scheduling entity.

13. The method of claim 1, further comprising:

transmitting from the scheduling entity, one or more broadcast messages or control signals, where the one or more broadcast messages or control signals are multiplexed in the first duplex symbol with one or more control messages or low data transmissions received the scheduling entity.

14. The method of claim 13, further comprising:

using a waveform processor to modify a characteristic of one or more signals carried in the first duplex symbol;

transmitting a first unidirectional symbol without using the waveform processor to modify the characteristic of signals in the first unidirectional symbol; and receiving a second unidirectional symbol that has been transmitted without using the waveform processor to modify the characteristic of signals in the second unidirectional symbol.

15. The method of claim 14, wherein the waveform processor includes a weighted overlap-add filter bank processor that improves separation between the uplink transmission and the downlink transmission.

16. A scheduling entity configured to manage a wireless communication network, comprising:

a processing system configured to:

schedule a first frame for transmission over a time division duplexing wireless network, wherein the first frame comprises a first duplex symbol that includes a first bandwidth to be used for uplink transmission to the scheduling entity and a second bandwidth to be used for downlink transmission from the scheduling entity; and use the second bandwidth to transmit scheduling information while the first frame is being transmitted, wherein the scheduling information is related to a second frame that is scheduled to be transmitted immediately after the first frame, and wherein the scheduling information includes an uplink grant or a downlink grant.

17. The scheduling entity of claim 16, further comprising:

an antenna array having a first plurality of antennas allocated to transmit signals from the scheduling entity and a second plurality of antennas allocated to receive directed to the scheduling entity.

18. A method of wireless communication at a subordinate entity, comprising:

receiving first scheduling information from a scheduling entity in a first duplex symbol of a first frame received from a wireless network that supports time division duplexing, wherein the first duplex symbol includes a first bandwidth that carries an uplink transmission to the scheduling entity and a second bandwidth that carries a downlink transmission from the scheduling entity, wherein the first scheduling information includes an uplink grant or a downlink grant; and communicating with the scheduling entity using a second frame configured in accordance with the first scheduling information, wherein a second duplex symbol in the second frame includes a third bandwidth that carries second scheduling information corresponding to a third frame.

19. The method of claim 18, wherein the first frame is a downlink-centric frame, and further comprising:

receiving a payload of the first frame in a plurality of downlink symbols;

transmitting an acknowledgement (ACK) or a negative acknowledgement (NAK) responsive to the payload, wherein the ACK or the NAK is transmitted using the first bandwidth; and receiving the scheduling information while transmitting the ACK or the NAK.

20. The method of claim 19, wherein the first frame comprises a third duplex symbol that includes an unused bandwidth corresponding in frequency to the first bandwidth, and wherein the third duplex symbol immediately precedes the first duplex symbol in transmission.

21. The method of claim 18, wherein the first frame is an uplink-centric frame, and further comprising:
transmitting a payload of the first frame in a plurality of symbols;
receiving the scheduling information using the second bandwidth, wherein the first duplex symbol is included in the plurality of symbols; and
receiving an ACK or a NAK after the payload is completely transmitted.

22. The method of claim 21, wherein the plurality of symbols comprises one or more uplink symbols.

23. The method of claim 18, wherein the scheduling information includes a high-priority grant.

24. The method of claim 18, wherein the first frame is configured in accordance with previous scheduling information provided in a fourth frame, wherein the fourth frame immediately precedes the first frame in transmission.

25. The method of claim 18, wherein the first duplex symbol comprises an orthogonal frequency division multiplexing symbol.

26. The method of claim 18, wherein the wireless network communicates using a single carrier, and wherein the first bandwidth includes a first sub-band of the single carrier and the second bandwidth includes a second sub-band of the single carrier.

27. The method of claim 18, wherein the wireless network employs carrier aggregation to provide an aggregated bandwidth, and wherein the first bandwidth includes a first carrier component of the aggregated bandwidth and the second bandwidth includes a second carrier component of the aggregated bandwidth.

28. The method of claim 27, wherein the first bandwidth is aligned with a boundary of the first carrier component, and the second bandwidth is aligned with a boundary of the second carrier component.

29. A subordinate device configured to communicate with a scheduling entity in a wireless communication network, comprising:
a processing system configured to:
receive first scheduling information from a scheduling entity in a first duplex symbol of a first frame received from a wireless network that supports time division duplexing, wherein the first duplex symbol includes a first bandwidth that carries an uplink transmission to the scheduling entity and a second bandwidth that carries a downlink transmission from the scheduling entity, wherein the first scheduling information includes an uplink grant or a downlink grant; and
communicate with the scheduling entity using a second frame configured in accordance with the first scheduling information, wherein a second duplex symbol in the second frame includes a third bandwidth that carries second scheduling information corresponding to a third frame.

30. The subordinate device of claim 29, wherein the first frame is a downlink-centric frame, and wherein the processing system is configured to:
receive a payload of the first frame in a plurality of downlink symbols;
transmit an acknowledgement (ACK) or a negative acknowledgement (NAK) responsive to the payload, wherein the ACK or the NAK is transmitted using the first bandwidth; and
receive the scheduling information while transmitting the ACK or the NAK,
wherein the first frame comprises a third duplex symbol that includes an unused bandwidth corresponding in frequency to the first bandwidth, and
wherein the third duplex symbol immediately precedes the first duplex symbol in transmission.

* * * * *